United States Patent
Dinan

(10) Patent No.: US 10,999,839 B2
(45) Date of Patent: May 4, 2021

(54) SCHEDULING REQUEST TRIGGERING IN A WIRELESS DEVICE

(71) Applicant: Samsung Electronics Co., Ltd., Suwon-si (KR)

(72) Inventor: Esmael Dinan, McLean, VA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/267,320

(22) Filed: Feb. 4, 2019

(65) Prior Publication Data

US 2019/0174490 A1 Jun. 6, 2019

Related U.S. Application Data

(63) Continuation of application No. 15/497,197, filed on Apr. 25, 2017, now Pat. No. 10,200,991.

(Continued)

(51) Int. Cl.
*H04W 72/04* (2009.01)
*H04W 72/14* (2009.01)
(Continued)

(52) U.S. Cl.
CPC ......... *H04W 72/0446* (2013.01); *H04L 5/001* (2013.01); *H04L 5/0046* (2013.01); *H04L 5/0053* (2013.01); *H04L 5/0098* (2013.01); *H04L 27/2602* (2013.01); *H04L 27/2613* (2013.01); *H04W 72/048* (2013.01); *H04W 72/0486* (2013.01); *H04W 72/0493* (2013.01);
(Continued)

(58) Field of Classification Search
CPC ......... H04W 72/0486; H04W 72/0493; H04W 72/08–10; H04W 72/1226–1242; H04W 72/1252; H04W 72/1257; H04W 72/1284; H04L 5/0044; H04L 5/0048–0053; H04L 47/30
See application file for complete search history.

(56) References Cited

U.S. PATENT DOCUMENTS

2014/0029584 A1 1/2014 Qu et al.
2017/0118766 A1* 4/2017 Baek ................. H04W 72/1268
2018/0092118 A1 3/2018 Kim et al.

OTHER PUBLICATIONS

3GPP TR 36.889 V1.0.1 (Jun. 2015); Technical Report; 3rd Generation Partnership Project; Technical Specification Group Radio Access Network; Study on Licensed-Assisted Access to Unlicensed Spectrum;(Release 13).

(Continued)

*Primary Examiner* — Pao Sinkantarakorn
(74) *Attorney, Agent, or Firm* — Jefferson IP Law, LLP

(57) ABSTRACT

A wireless device receives configuration parameters indicating a mapping restriction, of a plurality of mapping restrictions, of a logical channel to one or more radio resource types of a plurality of radio resource types. A buffer status report is triggered based on uplink data becoming available. An uplink grant indicating radio resources of a radio resource type of the plurality of radio resource types is received. A scheduling request is triggered in response to: the triggering the buffer status report; and the radio resource type not being of at least one first radio resource type, of the plurality of radio resource types, determined based on the plurality of mapping restrictions. The wireless device transmits the scheduling request.

20 Claims, 11 Drawing Sheets

Related U.S. Application Data

(60) Provisional application No. 62/327,265, filed on Apr. 25, 2016, provisional application No. 62/327,312, filed on Apr. 25, 2016.

(51) Int. Cl.

| | | |
|---|---|---|
| *H04W 72/12* | (2009.01) | |
| *H04L 27/26* | (2006.01) | |
| *H04W 76/20* | (2018.01) | |
| *H04W 76/27* | (2018.01) | |
| *H04L 5/00* | (2006.01) | |
| *H04W 74/08* | (2009.01) | |
| *H04W 88/10* | (2009.01) | |
| *H04W 24/10* | (2009.01) | |
| *H04W 56/00* | (2009.01) | |

(52) U.S. Cl.
CPC ... *H04W 72/1231* (2013.01); *H04W 72/1268* (2013.01); *H04W 72/1284* (2013.01); *H04W 72/1294* (2013.01); *H04W 72/14* (2013.01); *H04W 74/08* (2013.01); *H04W 74/0833* (2013.01); *H04W 76/20* (2018.02); *H04W 76/27* (2018.02); *H04W 88/10* (2013.01); *H04L 5/00* (2013.01); *H04L 5/0055* (2013.01); *H04L 5/0091* (2013.01); *H04L 27/26* (2013.01); *H04L 27/2601* (2013.01); *H04W 24/10* (2013.01); *H04W 56/00* (2013.01); *H04W 72/04* (2013.01); *H04W 72/12* (2013.01)

(56) References Cited

OTHER PUBLICATIONS

3GPP TS 36.300 V13.2.0 (Dec. 2015); Technical Specification; 3rd Generation Partnership Project; Technical Specification Group Radio Access Network; Evolved Universal Terrestrial Radio Access (E-UTRA)and Evolved Universal Terrestrial Radio Access Network; (E-UTRAN); Overall description; Stage 2 (Release 13).
3GPP TS 36.321 V13.0.0 (Dec. 2015); Technical Specification; 3rd Generation Partnership Project; Technical Specification Group Radio Access Network; Evolved Universal Terrestrial Radio Access (E-UTRA);Medium Access Control (MAC) protocol specification; (Release 13).
3GPP TS 36.331 V13.0.0 (Dec. 2015); Technical Specification; 3rd Generation Partnership Project; Technical Specification Group Radio Access Network; Evolved Universal Terrestrial Radio Access (E-UTRA);Radio Resource Control (RRC); Protocol specification (Release 13).
R2-151103; 3GPP TSG-RAN WG2 #89bis; Bratislava, Slovakia, Apr. 20-24, 2015; Agenda item: 7.1.3; Source: Intel Corporation; Title: Uplink QoS support for LAA; Document for: Discussion and Decision.
R2-151176; 3GPP TSG-RAN WG2 Meeting #89bis; Bratislava, Slovakia, Apr. 20-24, 2015; Agenda Item: 7.1.3; Source: Huawei, HiSilicon; Title: QoS Control in LAA UL Operation.
R2-151302; 3GPP TSG-RAN WG2 #89bis; Bratislava, Slovakia, Apr. 20-24, 2015; Agenda item: 7.1.3; Source: ITRI; Title: On Licensed-Assisted Access Uplink Issues.
R2-151325; 3GPP TSG RAN WG2 Meeting #89bis; Bratislava, Slovakia, Apr. 20-24, 2015; Source: CATT; Title: Routing of UL traffic; Agenda Item: 7.2.3; Document for: Discussion and Decision.
R2-151347; 3GPP TSG-RAN WG2 Meeting #89bis; Bratislava, Slovakia, Apr. 20-24, 2015; Agenda item: 7.1.3; Source: LG Electronics Inc.; Title: Logical Channel Prioritization in LAA; Document for: Discussion and Decision.
R2-151455; 3GPP TSG-RAN WG2 Meeting#89bis; Bratislava, Slovakia, Apr. 20-24, 2015; Agenda item: 7.1.3; Source: Fujitsu; Title: MAC impact for supporting UL transmission on LAA SCellDocument for: Discussion and Decision.
R2-152243; 3GPP TSG-RAN WG2 Meeting #90; Fukuoka, Japan, May 25-29, 2015; Source: Samsung; Title: UL LAA support and UL Scheduling in MAC; Agenda item: 7.1.3; Document for: Discussion and Agreement.
R2-152279; 3GPP TSG RAN WG2 Meeting #90; Fukuoka, Japan, May 25-29, 2015; Source: CATT; Title: QoS control for LAA UL transmission; Agenda Item: 7.1.3; Document for: Discussion and Decision.
R2-152291; 3GPP TSG-RAN WG2 Meeting #90; Fukuoka, Japan, May 25-29, 2015; Agenda item: 7.1.3 (FS_LTE_LAA); Source: LG Electronics Inc.; Title: Logical Channel Prioritization in LAADocument for: Discussion and Decision.
R2-152364; revision of R2-151652; 3GPP TSG-RAN WG2 Meeting #90; Fukuoka, Japan, May 25-29, 2015 Agenda Item : 7.1.3 (FS_LTE_LAA); Source : LG Electronics Inc.; Title : Consideration on UL MAC for unlicensed band.
R2-152469; 3GPP TSG-RAN WG2 #93bis; Dubrovnik, Croatia, Apr. 11-15, 2016; Agenda item: 8.1.1; Source: Intel Corporation; Title: Uplink QoS support for LAA; Document for: Discussion and Decision.
R2-162394; 3GPP TSG-RAN WG2 Meeting #93bis; Dubrovnik, Croatia, Apr. 11-15, 2016; Source: Samsung; Title: UL scheduling for eLAA; Agenda item: 8.1.1; Document for: Discussion and Agreement.
R2-162429; 3GPP TSG-RAN WG2 Meeting #93bis; Dubrovnik, Croatia Apr. 11-15, 2016; Agenda item: 8.1.1; Source: Huawei, HiSilicon; Title: Considerations on Qos control and UL transmission on LAA SCellDocument for: Discussion and Decision.
R2-162669; 3GPP TSG-RAN WG2 Meeting #93bis; Dubrovnik, Croatia, Apr. 11-15, 2016; Agenda item: 8.1.1; Source: Nokia, Alcatel-Lucent Shanghai Bell; Title: UL support for LAA SCells; WID/SID: LTE_eLAA-Core—Release 14; Document for: Discussion and Decision.
Tdoc R2-151503; 3GPP TSG-RAN WG2 #89bis; Bratislava, Slovakia, Apr. 20-24, 2015; Agenda Item: 7.1.3; Source: Ericsson; Title: Routing restrictions in LAA scenarios; Document for: Discussion, Decision.
Tdoc R2-152481; 3GPP TSG-RAN WG2 #90; Fukuoka, Japan, May 25-29, 2015; Agenda Item: 7.1.3; Source: Ericsson; Title: Further details on routing restrictions in LAA; Document for: Discussion, Decision.
Tdoc R2-152659; 3GPP TSG-RAN WG2 #90; Fukuoka, Japan, May 25-29, 2015; Agenda Item: 7.1.3; Source: InterDigital Communications; Title: MAC Impacts for Uplink Operation in Unlicensed SpectrumDocument for: Discussion, Decision.
Tdoc R2-162748; 3GPP TSG-RAN WG2 #93bis; Dubrovnik, Croatia, Apr. 11-15, 2016; Agenda Item: 8.1.1; Source: Ericsson; Title: Routing restrictions in LAA; Document for: Discussion, Decision.

* cited by examiner

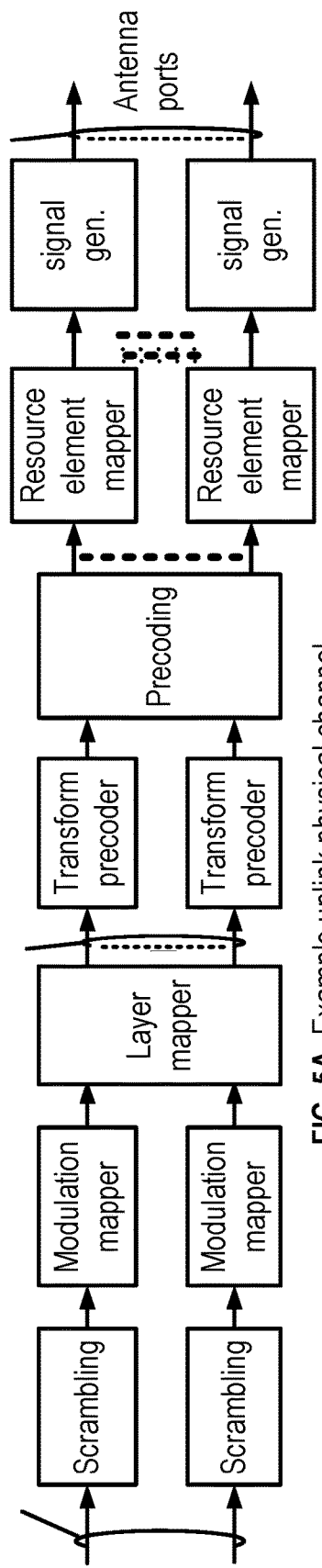
FIG. 5A Example uplink physical channel
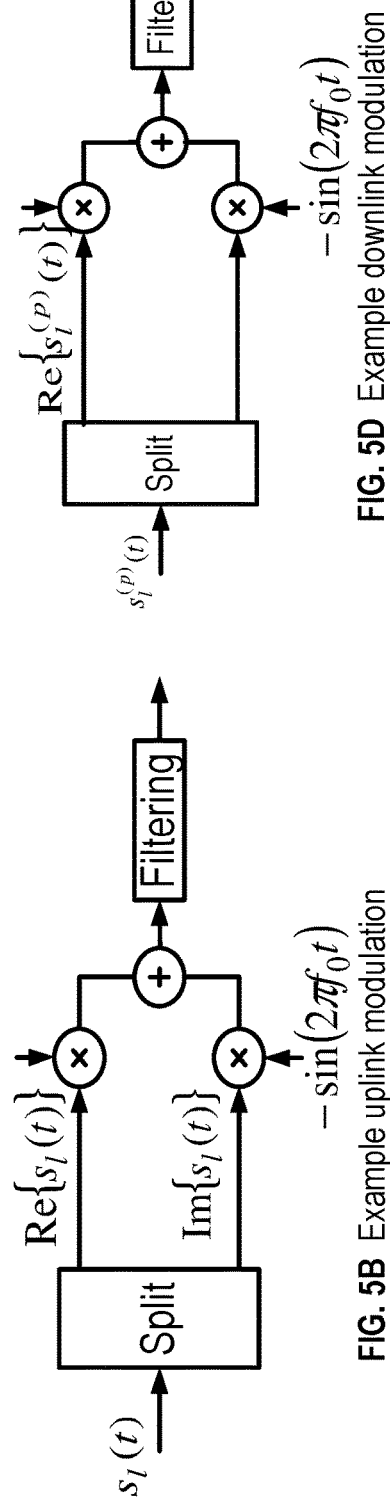
FIG. 5B Example uplink modulation
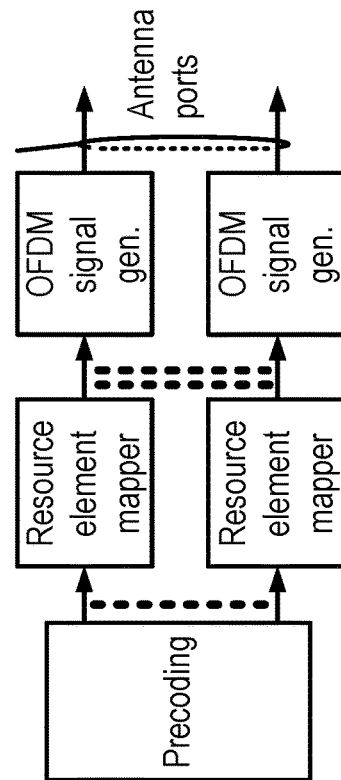
FIG. 5D Example downlink modulation
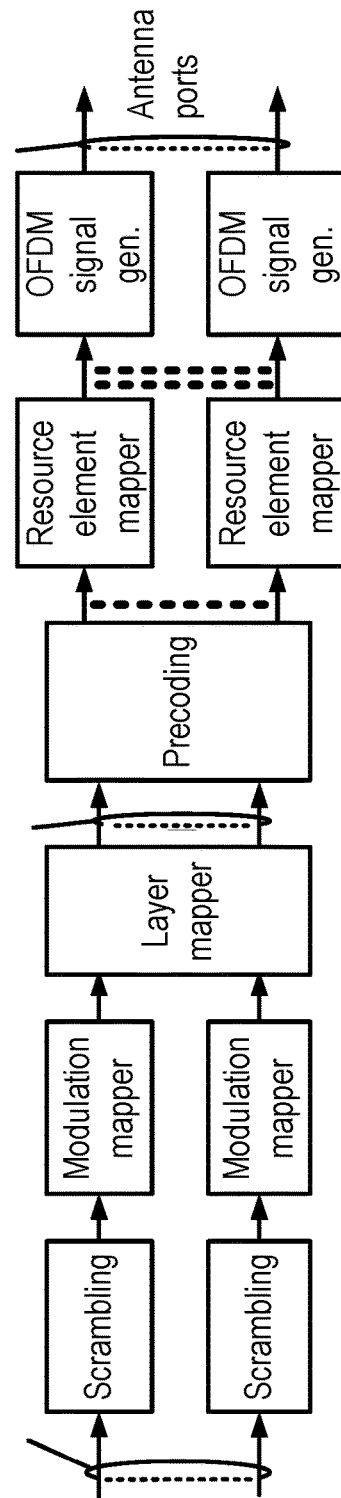
FIG. 5C Example downlink physical channel FIG. 7  Dual-Connectivity- two MAC entities at UE side

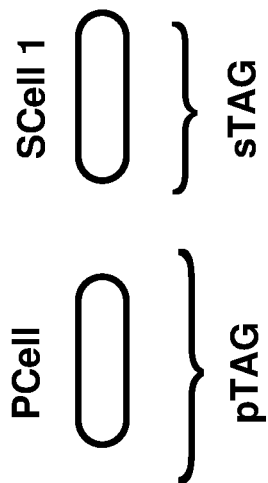
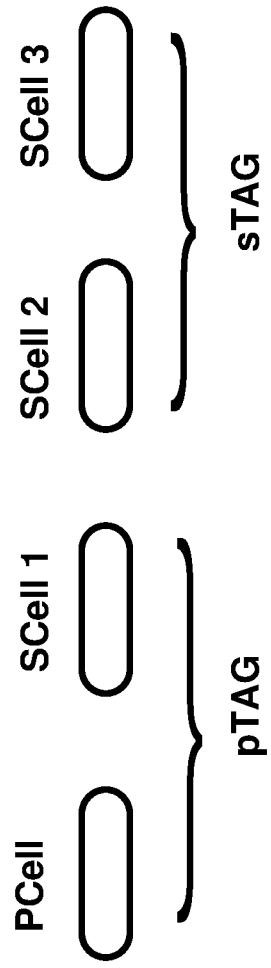
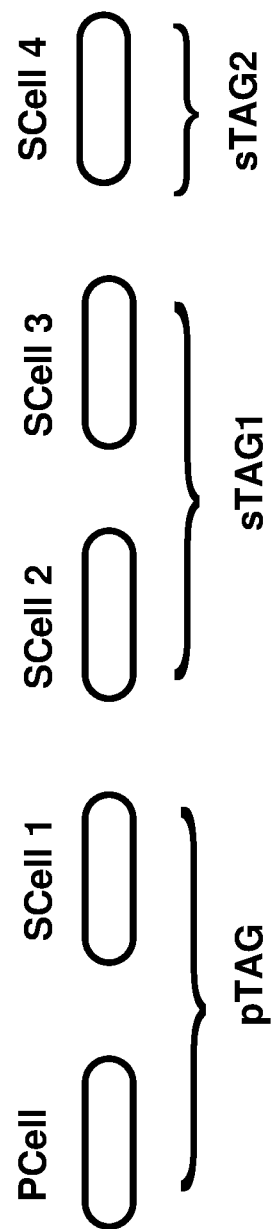
FIG. 8

SCHEDULING REQUEST TRIGGERING IN A WIRELESS DEVICE

CROSS-REFERENCE TO RELATED APPLICATIONS

This application is a continuation of Ser. No. 15/497,197, filed Apr. 25, 2017, which claims the benefit of U.S. Provisional Application No. 62/327,265, filed Apr. 25, 2016 and U.S. Provisional Application No. 62/327,312, filed Apr. 25, 2016, which are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

DETAILED DESCRIPTION OF EMBODIMENTS

Figure 1:
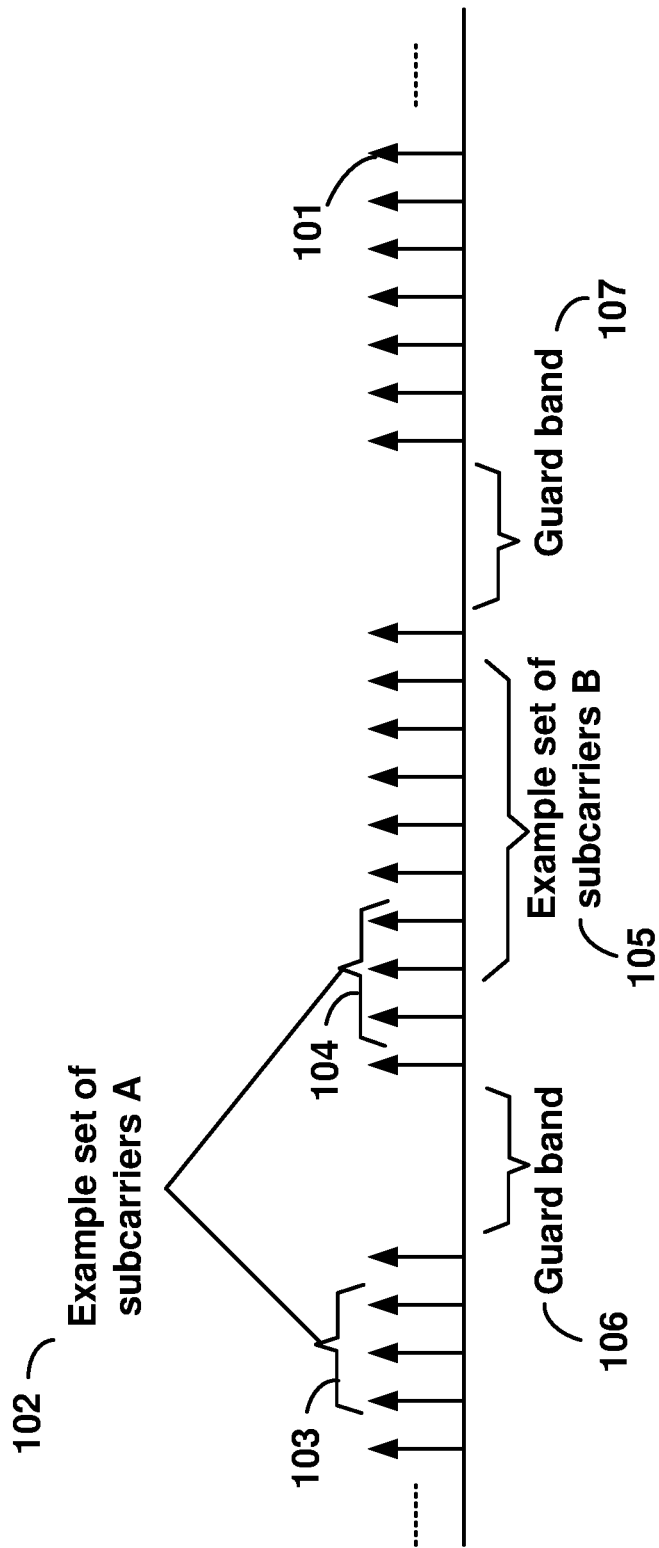
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
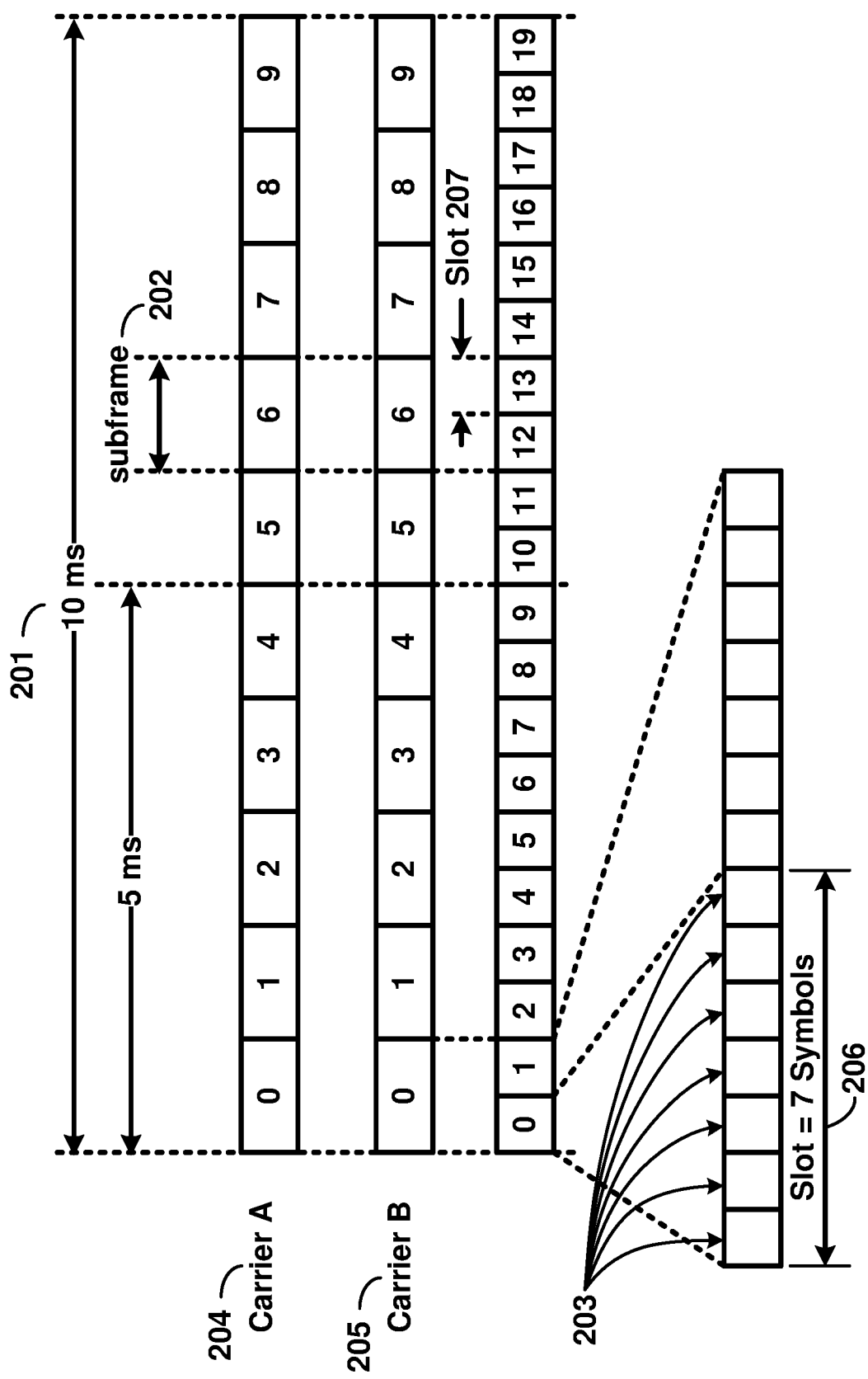
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
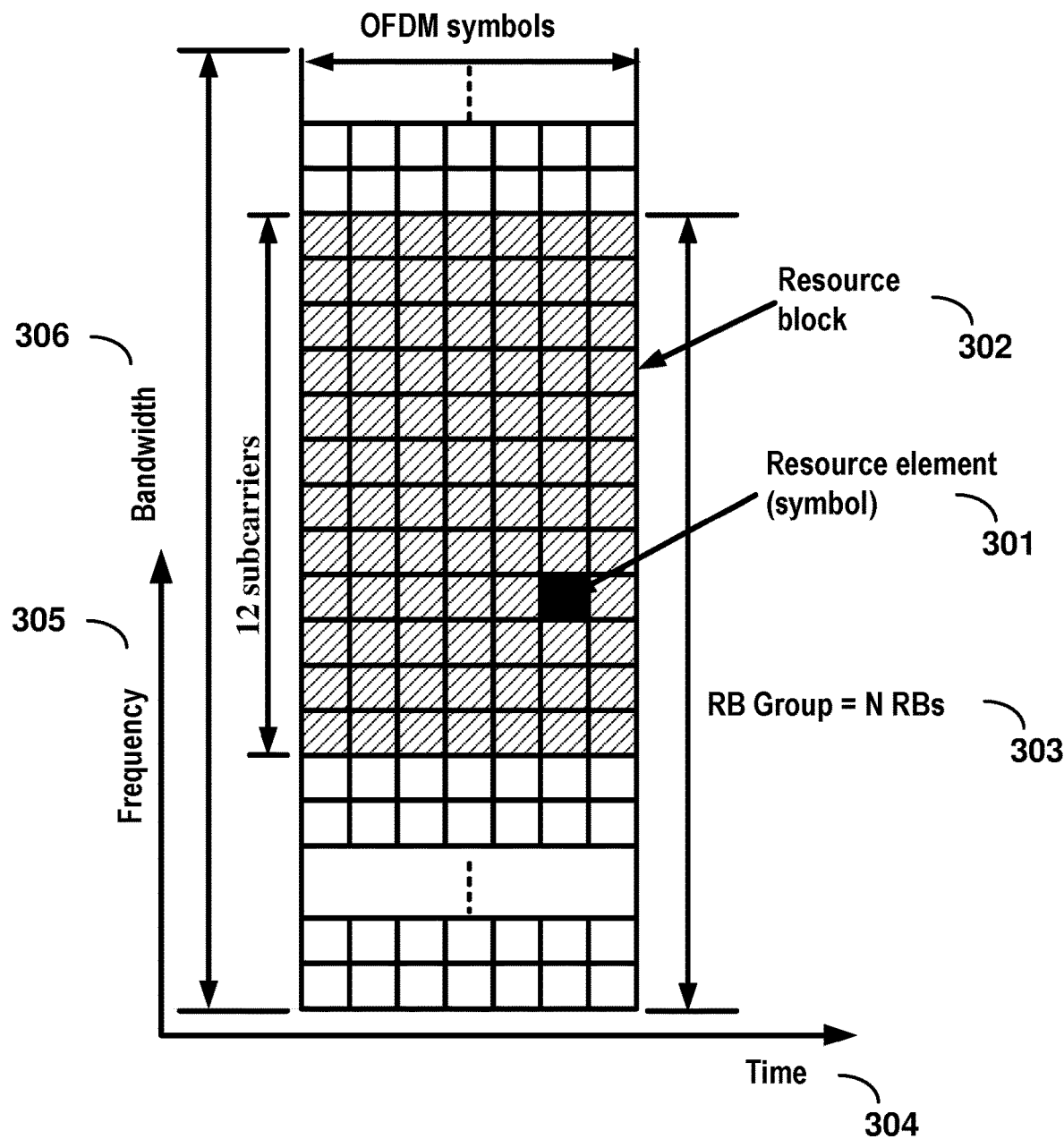
FIG. 3 is an example diagram depicting OFDM radio resources as per an aspect of an embodiment of the present disclosure.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a carrier.

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
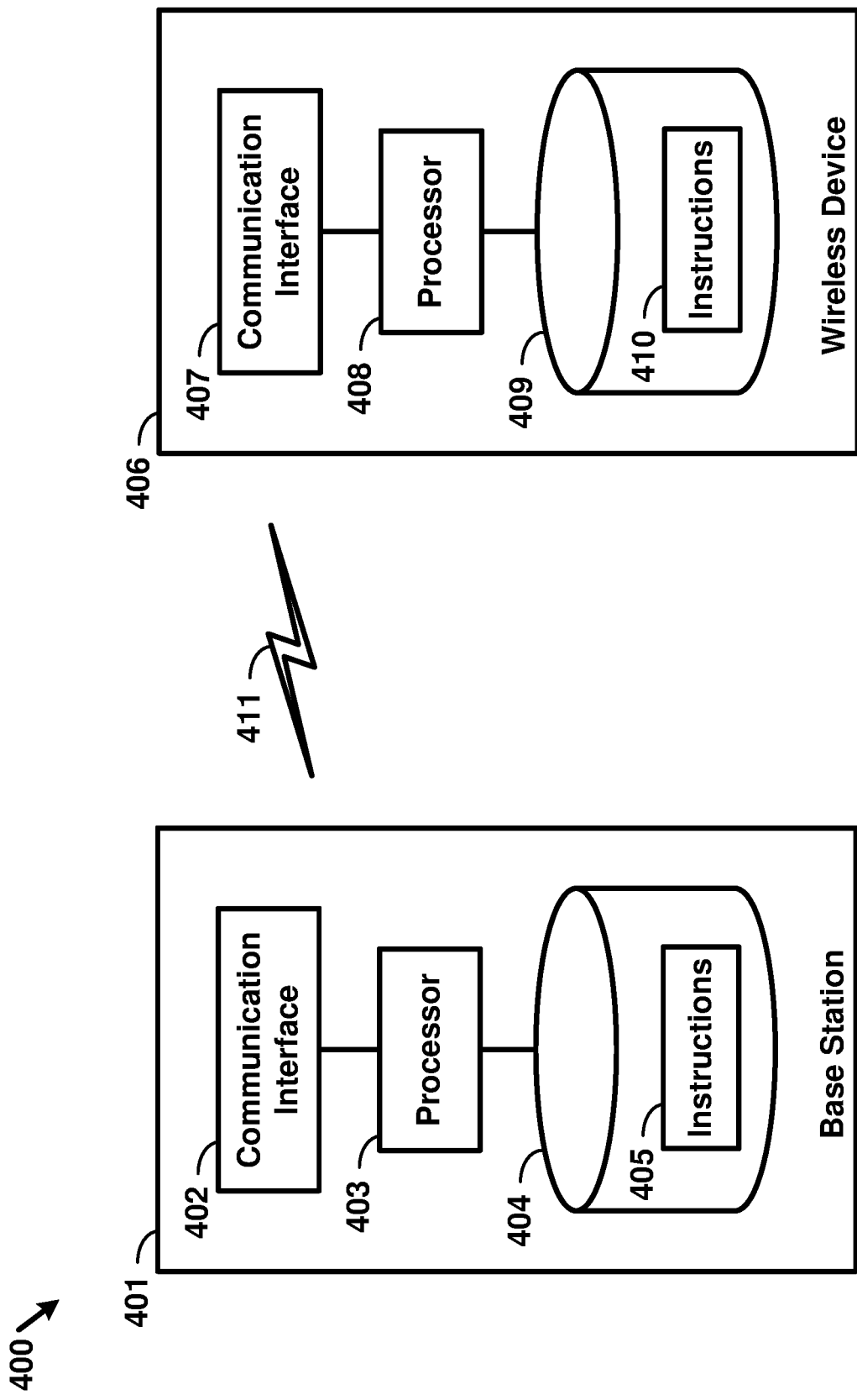
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, a network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface or an Xn interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
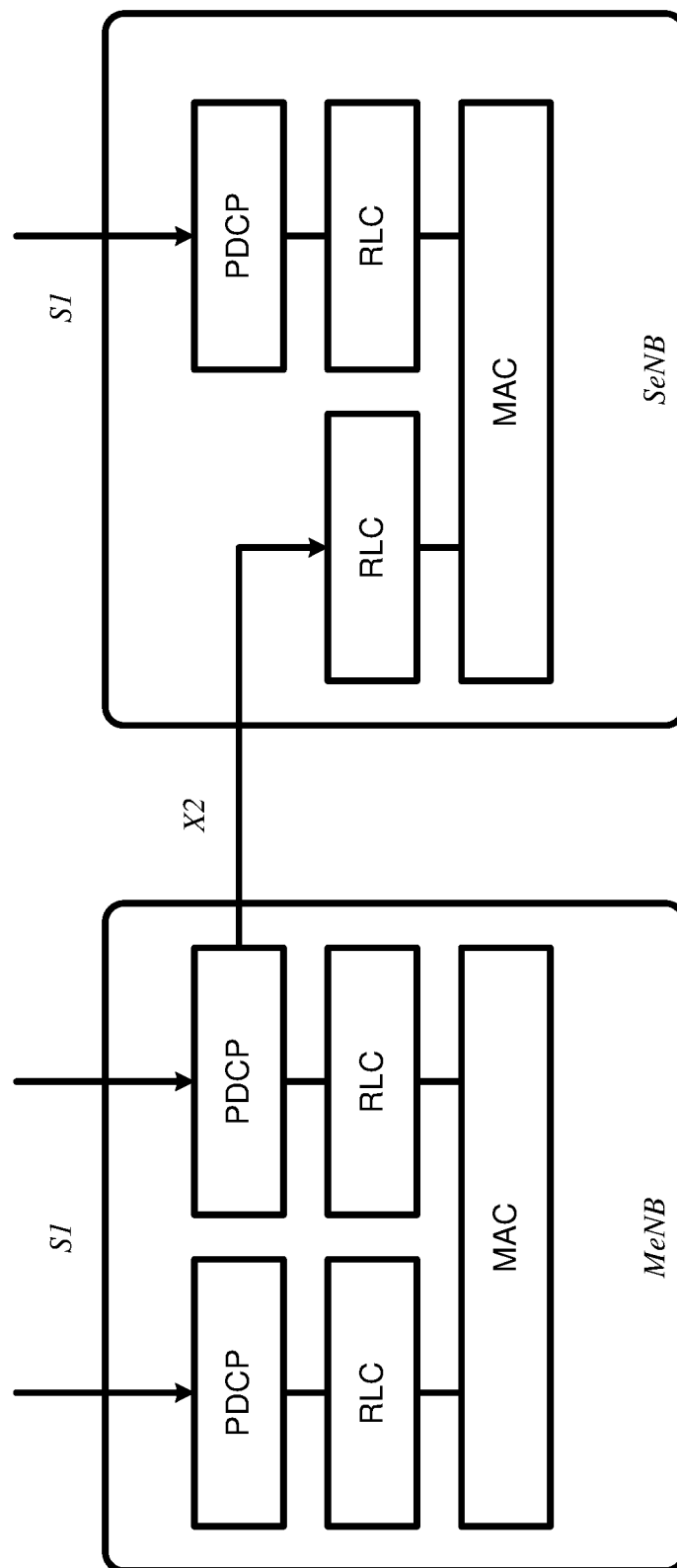
FIG. 6 is an example diagram for a protocol structure with CA and DC as per an aspect of an embodiment of the present disclosure.
Figure 7:
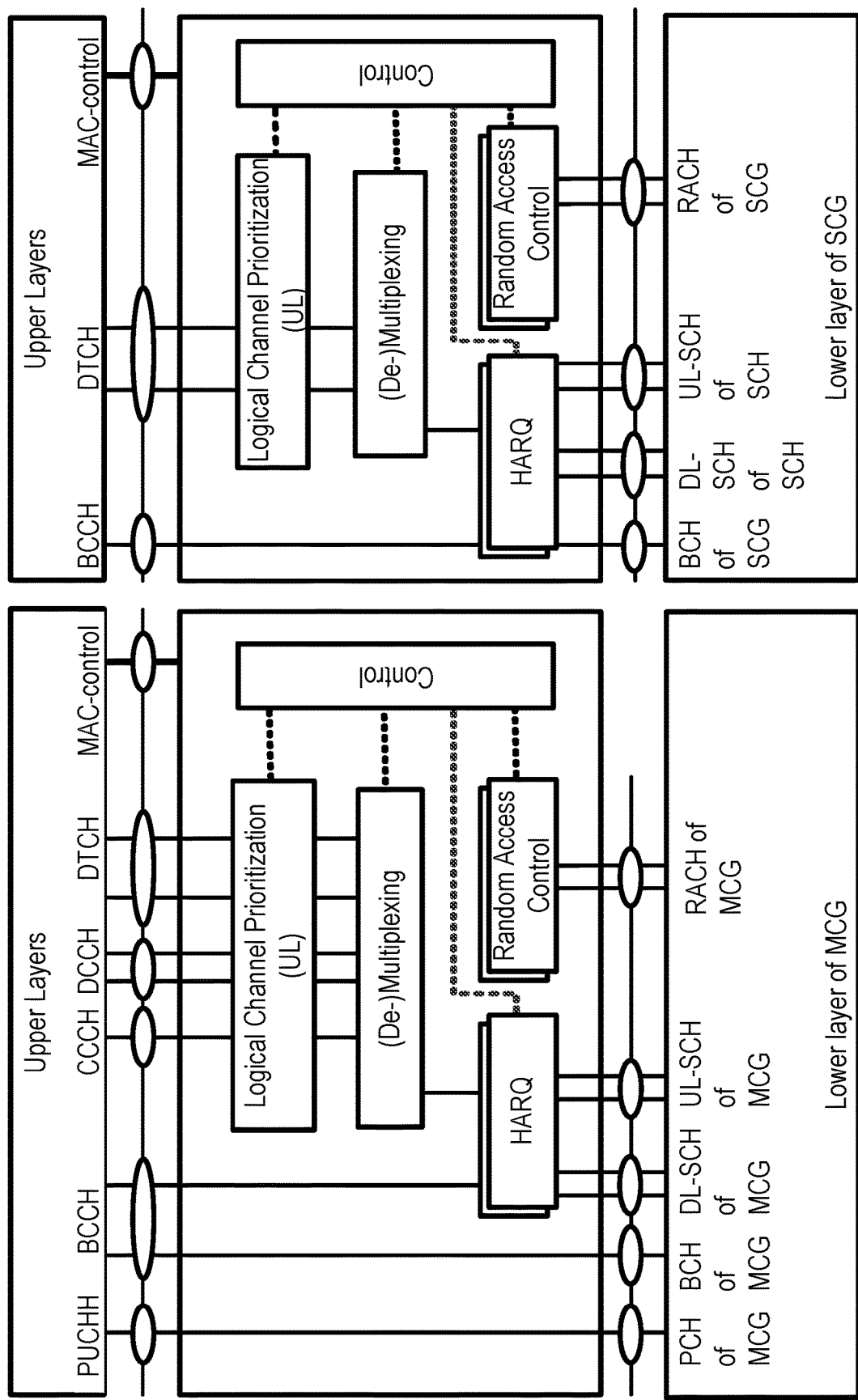
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
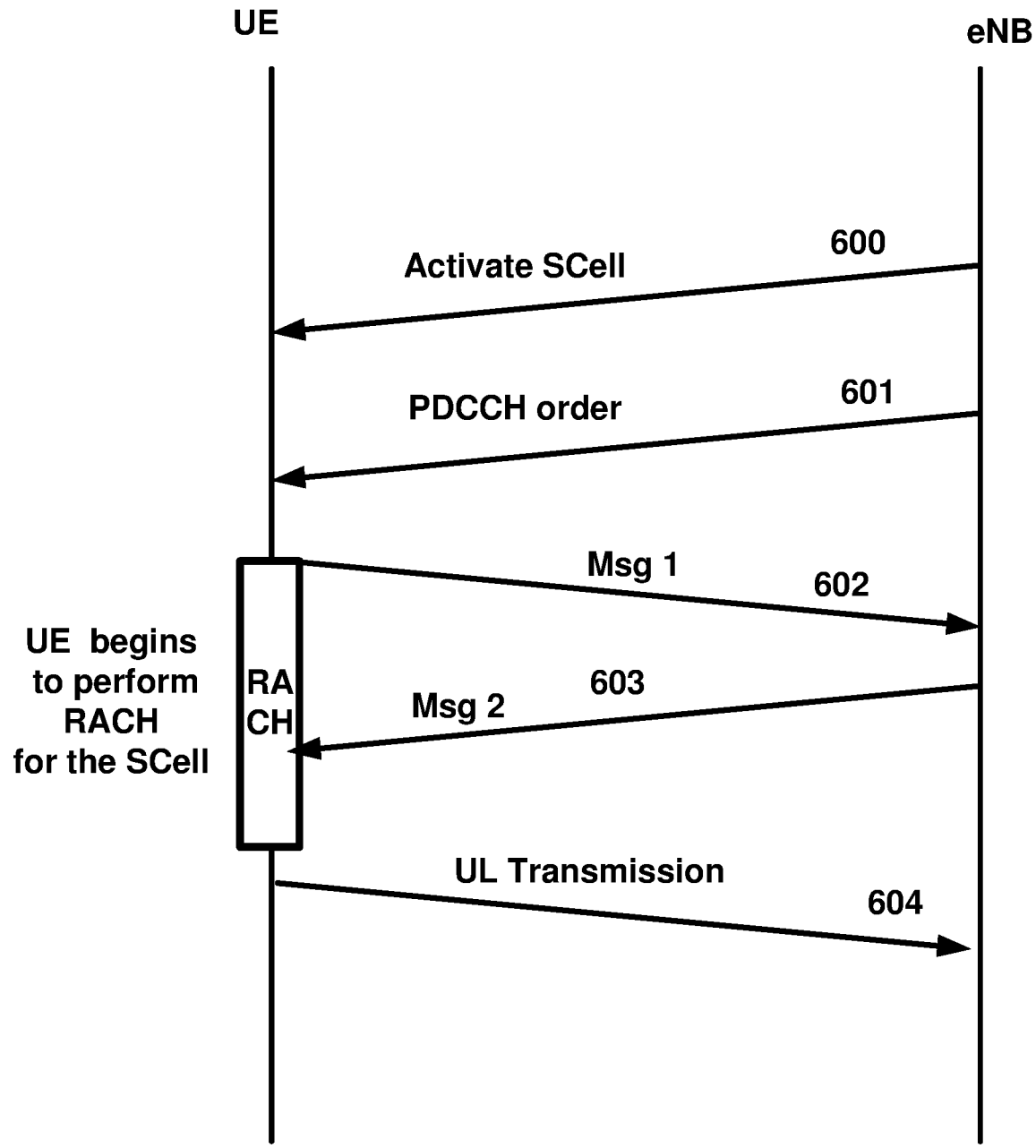
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer may be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore be needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
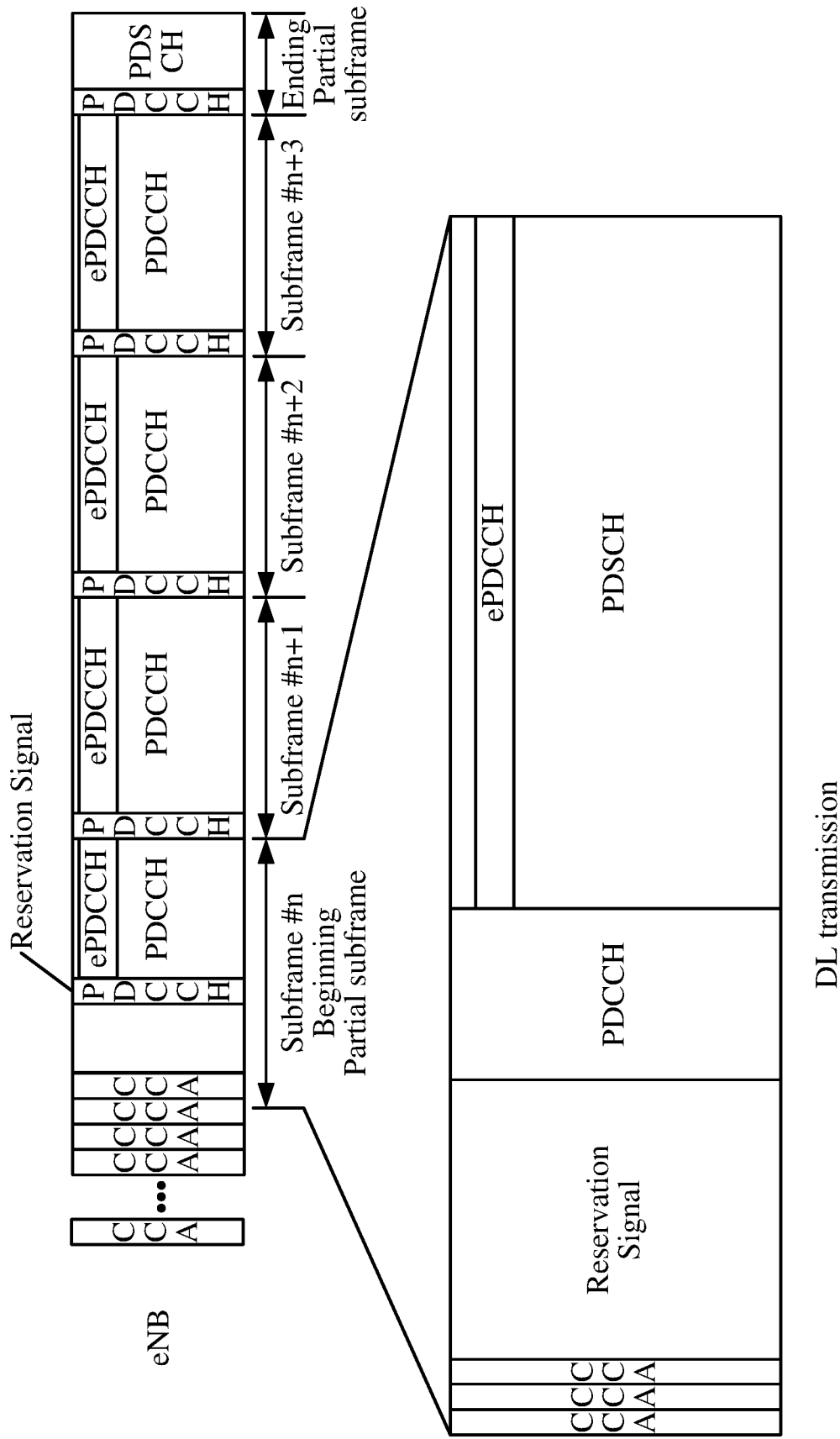
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one license cell and at least one unlicensed (for example, an LAA cell). The configuration parameters of a cell may, for example, comprise configuration parameters for physical channels, (for example, a ePDCCH, PDSCH, PUSCH, PUCCH and/or the like).

In an example, an eNB and/or UE may support a plurality of radio resource types. In an example, various radio resource types may be configured with various TTIs and/or numerologies. In an example, a first radio resource type may operate using at least one first TTI/numerology and a second radio resource type may operate using at least one second TTI/numerology. In an example, various resource types may operate in different frequencies or frequency bands. In an example, a first radio resource type may operate on one or more licensed cells and a second radio resource type may operate on one or more unlicensed cells. An example may use a combination of various features to determine a radio resource type, e.g. frequency, TTI/numerology, frequency band type, etc. Some of the example embodiments are provided for licensed and unlicensed (e.g. LAA cells) radio resource types. These examples may equally apply when other radio resource types are implemented, e.g., based on TTI/numerology.

In an example, an eNB and/or UE may support a plurality of radio resource types. In an example, various radio resource types may be configured with various TTIs and/or numerologies. In an example, a first radio resource type may operate using at least one first TTI/numerology and a second radio resource type may operate using at least one second TTI/numerology. In an example, various resource types may operate in different frequencies or frequency bands. In an example, a first radio resource type may operate on one or more licensed cells and a second radio resource type may operate on one or more unlicensed cells. An example may use a combination of various features to determine a radio resource type, e.g. frequency, TTI/numerology, frequency band type, etc. Some of the example embodiments are provided for licensed and unlicensed (e.g. LAA cell) radio resource types. These examples may equally apply when other radio resource types are implemented, e.g., based on TTI/numerology. In an example, one, two, three or more radio resource types may be defined.

In downlink, an eNB may decide which data of which radio bearer/logical channel is mapped to which radio resource type in a plurality of radio resource types (e.g. licensed/unlicensed carriers, different subcarriers and subframe types/durations, different frequencies). For example, the eNB may consider sending data in the licensed carrier if the unlicensed carrier is unstable, congested, and/or has poor quality e.g. due to interference. Data transmission may be limited to a certain radio resource type depending on (SRB/DRB)/logical channel configuration. QoS may be supported employing radio bearers in the air interface.

In an example embodiment, the radio environment in a first radio resource type (e.g. unlicensed spectrum) may be different compared with that a second radio resource type (e.g. on licensed spectrum). In unlicensed spectrum, there may be various sources for interference which is outside the control of the operator, e.g., other RATs (e.g. WiFi) and/or LAA-capable eNB/UEs of other operators. The unlicensed carrier may experience high interference. LBT may be supported to meet regulatory requirements. This may delay packet transmission and may impact QoS of some bearers, e.g. latency requirements might not be satisfied. Example such bearers may be voice, real time gaming, and/or SRB.

Bearer/logical channel may be configured by an eNB as to whether they may be only served via a first radio resource type (e.g. LAA cells) or whether they may only be served via a second radio resource type (e.g. licensed cells) or both first and second radio resource types. In an example, the network/eNB may configure per bearer (SRB/DRB) whether it can be offloaded to a first radio resource type (e.g. LAA cells) and/or a second radio resource type (e.g. licensed cells). In an example, the network/eNB may configure per logical channel whether it can be offloaded to a first radio resource type (e.g. LAA cells) and/or a second radio resource type (e.g. licensed cells).

In an example embodiment, on an LAA carrier, packets may not be received within some time limit for example because of LBT for UL transmission. Delay sensitive bearers/logical channels (e.g. voice, RRC signaling) may be configured not to be transmitted over the UL LAA SCells. A bearer/logical channel may be configured to use the UL grants only for UL licensed serving cells. Otherwise, it may use the UL grants from licensed and/or unlicensed cells.

In an example embodiment, the Logical Channel Prioritization procedure may be applied when a new transmission is performed by a UE. In order for the UE MAC to differentiate whether a new transmission is on a UL of a first radio resource type (e.g. LAA cells) or on a UL of a second radio resource type (e.g. licensed cells), layer one (PHY) may indicate for an UL grant whether the uplink grant is for a first radio resource type (e.g. LAA cells) or a second radio resource type (e.g. licensed cells). A base station may transmit to a wireless device an uplink grant indicating resource blocks and radio resource type for uplink transmission of one or more uplink transport blocks.

In an example embodiment, for a new transmission on an UL LAA SCell, the UE MAC entity may apply the logical channel prioritization procedure on the logical channels configured by RRC that may use the UL grants for both the UL LAA SCells and the licensed UL serving cells. The logical channels that can only use the UL grants for the licensed UL serving cells will not be considered for the new transmission on a UL LAA SCell.

In an example, the MAC UE entity may differentiate whether a new transmission is on a first radio resource type (e.g. LAA cells) or on a second radio resource type (e.g. licensed cells) and use this information to apply logical channel prioritization procedure according to which logical channels can use only a first or second radio resource types or can use both first radio resource type and second radio resource type.

In an example embodiment, per bearer, per logical channel, and/or per logical channel group configuration may be considered. The eNB may configure logical channel to radio resource type (e.g. licensed/LAA cell) restrictions per bearer, per logical channel, and/or per logical channel group.

SRBs may be restricted to only be sent on carriers in a first radio resource type or SRBs may be sent on carriers in a second radio resource type or both. The eNB may indicate whether bearers/logical channels can be sent over a first radio resource type. This may apply also for SRBs and it may be possible to configure the UE to send SRBs on second radio resource type.

In order for the eNB to know what UL grant to provide (for first or second radio resource types), the UE may inform the eNB which bearers have buffers comprising UL data. A UE sends Buffer Status Reporting (BSR) to the eNB. This Buffer Status report includes logical channel group ID and its corresponding UL buffer status. The 2-bit logical channel group ID is eNB configured ID to group the logical channels of the same or similar QoS in one group ID. This is to allow the eNB to perform inter and intra UE prioritization for allocating the UL resources. In an example, this LCGID may also be reused or extended to take into account the logical channels that can use the UL grants only for the UL via a first radio resource type or a second radio resource type and the logical channels that can use the UL grants via both first and second radio resource types.

In an example embodiment, LCGID#0 may be used for RRC signaling and delay sensitive services (e.g. voice, streaming video). If a UE's serving cell contains activated UL LAA SCell and the BSR indicates only buffer status from LCGID#0, the eNB may not allocate UL grants from the LAA SCell to the UE. In an example, the UL resources for PUSCH may be classified as licensed carrier and unlicensed carrier. For UL resources for PUSCH in licensed carrier, LCGID#0 may be considered higher priority than other LCGIDs by the eNB scheduler. Among UEs with LCGID#0, it may be scheduled like in the legacy (e.g. round-robin).

In an example embodiment, the LCGID may be used by the eNB to differentiate between buffer status on logical channels that can use UL grants of the first radio resource type and the buffer status on logical channels that can use UL grants for the second radio resource type, and the buffer status on logical channels that can use UL grants for both the first and second radio resource types.

In an example embodiment, information element unlicensed-Prohibited may be employed to indicate that a LC, bearer, and/or LCG is prohibited for transmission on an LAA cell. This variable may be a binary variable. If the variable is not present, it may indicate that the corresponding data can be routed on licensed or unlicensed cells.

Figure 11:
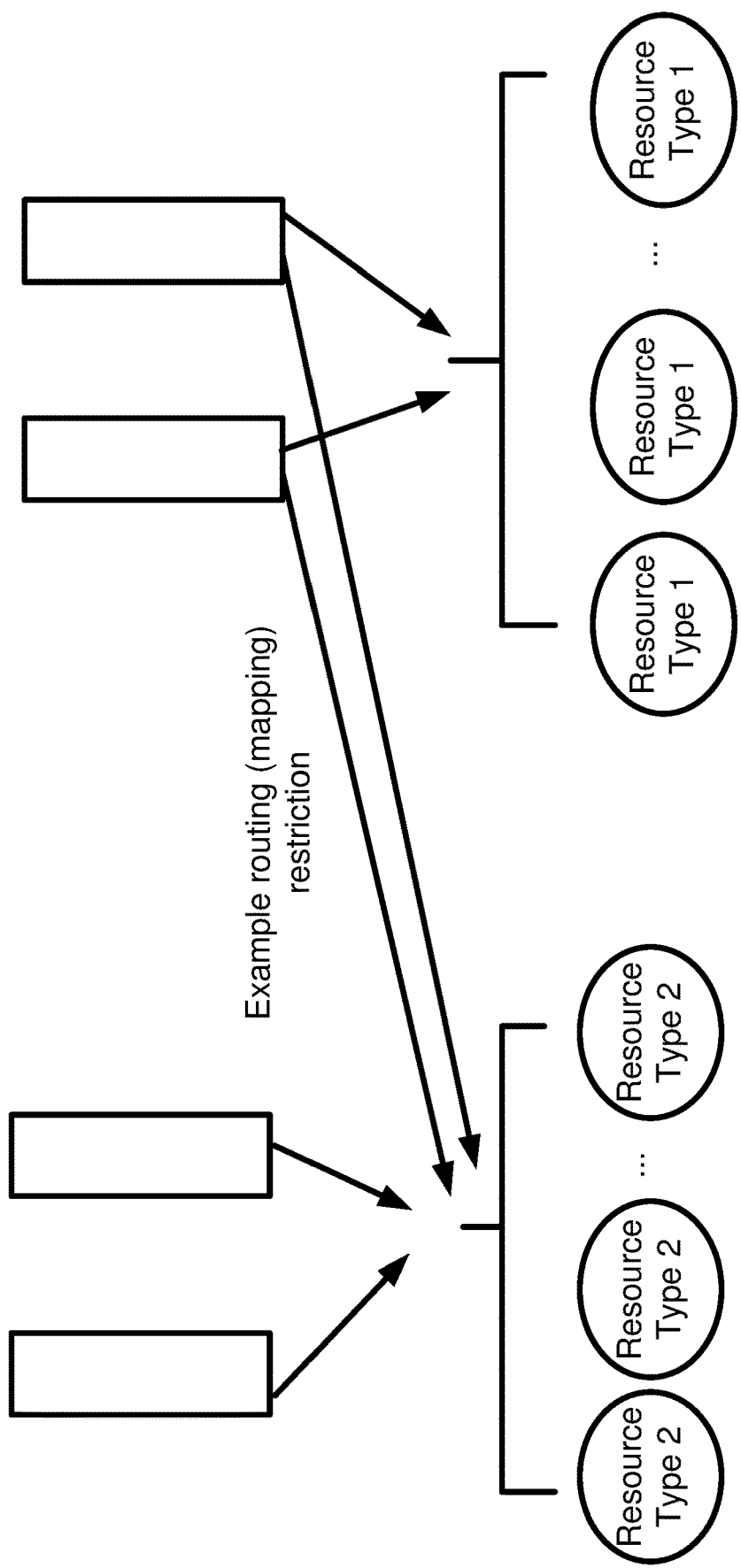
FIG. 11 is an example diagram depicting example logical channels and example mapping restrictions as per an aspect of an embodiment of the present disclosure.

FIG. 11 shows an example routing (mapping) restriction according to an example embodiment. In an example, a routing (mapping) restriction information element may include one or more parameters indicating one or more radio resource types that a logical channel or a logical channel group can be mapped to. The UE may employ the routing (mapping) restriction information element to transmit data of the logical channels using one or more transport blocks and via one or more radio resource types indicated in the routing (mapping) restriction.

Example configuration for routing restrictions per bearer may be implemented. The IE RadioResourceConfigDedicated may be used to setup/modify/release RBs, to modify the MAC main configuration, to modify the SPS configuration and to modify dedicated physical configuration.

Example configuration for routing restrictions per logical channel may be implemented. The IE LogicalChannelConfig may be used to configure the logical channel parameters. A logical channel configuration may comprise one or more of the following parameters. bucketSizeDuration: Bucket Size Duration for logical channel prioritization (e.g., value in milliseconds, e.g. value ms50 corresponds to 50 ms, ms100 corresponds to 100 ms and so on). logicalChannelGroup: mapping of logical channel to logical channel group for BSR reporting. logicalChannelSR-Mask: controlling SR triggering on a logical channel basis when an uplink grant is configured. logicalChannelSR-Prohibit: e.g. value True may indicate that the logicalChannelSR-ProhibitTimer is enabled for the logical channel. E-UTRAN (optionally) configures the field (e.g. indicates value TRUE) if logicalChannelSR-ProhibitTimer is configured. prioritisedBitRate: Prioritized Bit Rate for logical channel prioritization (e.g. value in kilobytes/second, value kBps0 corresponds to 0 kB/second, kBps8 corresponds to 8 kB/second, kBps16 corresponds to 16 kB/second and so on). Infinity may be the applicable value for SRB1 and SRB2. priority: Logical channel priority (e.g. value is an integer). SRmask: the field is optionally present if ul-SpecificParameters is present, need OR; otherwise it may not be present. Some of the above example parameters may be optional. Other example parameters may be configured for a logical channel.

Example configuration for routing restrictions per logical channel group may employ the example configuration per logical channel. The eNB may consider the routing restrictions into account when the eNB configures a routing restriction for a logical channel so that one or more logical channels in a given logical channel group have the same routing restrictions. For example, two logical channels with two different routing restrictions may not be configured in the same logical channel group. This may enable the eNB to assume that data belonging to the same logical channel group have the same routing limitations. When a BSR is reported for a logical channel group, the eNB may employ the BSR to properly allocate resources on one or more LAA cells, one or more licensed cells, or both licensed and unlicensed cells. The eNB may employ other parameters such as load, congestion, and channel quality to allocate resources on different cells. A mapping (routing) restriction of a logical channel to one or more radio resource types indicates that the logical channel can employ the one or more radio resource types for transmission of uplink and/or downlink data.

In an example embodiment, the eNB may assign a routing restriction to a logical channel group comprising one or more logical channels. For example, the eNB may configure logical channel group 0 to be transmitted (routed) on a second radio resource type (e.g. licensed cells). For example, the eNB may configure logical channel group 1 to be transmitted (routed) on a first and/or second radio resource types (e.g. licensed and/or LAA cells) depending on resource availability. The eNB may transmit at least one RRC message to configure a plurality of cells. The at least one RRC message may comprise one or more parameters to associate a routing (mapping) restriction to a logical channel group number. For example, at least one RRC message may comprise a sequence of parameters, and an element in the sequence may comprise a parameter for routing restriction and a logical channel group number (or a logical channel number). For example, at least one RRC message may comprise a sequence of parameters, and an element in the sequence may comprise a parameter for routing restriction.

The parameters may be ordered according to the logical channel group ID (or logical channel ID).

The eNB may transmit one or more RRC message to configure a plurality of cells and one or more radio resource types (e.g. licensed cell and one or more LAA cells). The one or more RRC messages may comprise MAC-MainConfig. The IE MAC-MainConfig may be used to specify the MAC main configuration for signaling and data radio bearers. MAC main configuration parameters may be configured independently per Cell Group (e.g. MCG or SCG).

In an example, MAC-MainConfig information element may comprise one or more of the following parameters. periodicBSR-Timer: Timer for BSR reporting (e.g. value in number of sub-frames, e.g. value sf10 corresponds to 10 sub-frames, sf20 corresponds to 20 sub-frames and so on). retxBSR-Timer: Timer for BSR reporting (e.g. value in number of sub-frames, value sf640 corresponds to 640 sub-frames, sf1280 corresponds to 1280 sub-frames and so on). logicalChannelSR-ProhibitTimer: Timer used to delay the transmission of an SR for logical channels enabled by logicalChannelSR-Prohibit (e.g. value sf20 corresponds to 20 subframes, sf40 corresponds to 40 subframes, and so on).

The UE may transmit UE-EUTRA-Capability to the eNB to indicate one or more UE capability to the eNB. The IE UE-EUTRA-Capability is used to convey the E-UTRA UE Radio Access Capability Parameters, and the Feature Group Indicators for mandatory features to the network. The IE UE-EUTRA-Capability is transferred in E-UTRA or in another RAT. An example capability parameter is shown below: MAC-Parameters-r12::=SEQUENCE {logicalChannelSR-ProhibitTimer-r12: ENUMERATED {supported} OPTIONAL, longDRX-Command-r12:ENUMERATED {supported} OPTIONAL}. In an example, logicalChannelSR-ProhibitTimer: Indicates whether the UE supports the logicalChannelSR-ProhibitTimer.

Example Buffer Status Report (BSR) MAC control elements comprise: Short BSR and Truncated BSR format: one LCG ID field and one corresponding Buffer Size field; and Long BSR format: four Buffer Size fields, corresponding to LCG IDs #0 through #3. Other BSR example formats may be defined. The BSR formats may be identified by MAC PDU subheaders with LCIDs. Example fields LCG ID and Buffer Size are defined as follow: LCG ID: The Logical Channel Group ID field identifies the group of logical channel(s) which buffer status is being reported. The length of the field may be 2 bits; buffer Size: The buffer size field identifies the total amount of data available across logical channels of a logical channel group after MAC PDUs for the TTI have been built. The amount of data may be indicated in number of bytes. It may include data that is available for transmission in the RLC layer and in the PDCP layer. The size of the RLC and MAC headers may not be considered in the buffer size computation. The length of this field may be 6 bits. An example short BSR and/or truncated BSR MAC control element may comprise of LCG ID field and buffer size field. An example, long BSR MAC control element may comprise of four buffer size fields for four logical channel groups. Buffer size field value may indicate the amount of data in a logical channel or logical channel group.

In an example, Sidelink BSR and truncated Sidelink BSR MAC control elements comprises of one destination index field, one LCG ID field and one corresponding Buffer Size field per reported target group. The Sidelink BSR MAC control elements may be identified by MAC PDU subheaders with LCIDs as. They may have variable sizes. For an included group, example fields are defined as follows. Destination Index: The Destination Index field identifies the ProSe Destination. The length of this field is 4 bits. The value is set to the index of the destination reported in destinationInfoList and if destinationInfoListUC is also reported, the value is indexed sequentially. LCG ID: The Logical Channel Group ID field identifies the group of logical channel(s) which buffer status is being reported. The length of the field may be 2 bits. Buffer Size: The Buffer Size field identifies the total amount of data available across logical channels of a LCG of a ProSe Destination after MAC PDUs for the TTI have been built. The amount of data is indicated in number of bytes. It may include data that is available for transmission in the RLC layer and in the PDCP layer. The size of the RLC and MAC headers are not considered in the buffer size computation. The length of this field may be 6 bits. Buffer Sizes of LCGs may be included in decreasing order of the highest priority of the sidelink logical channel belonging to the LCG irrespective of the value of the Destination Index field.

In an example, the buffer status reporting procedure may be used to provide the serving eNB with information about the amount of data available for transmission in the UL buffers associated with the MAC entity. RRC controls BSR reporting by configuring timers periodicBSR-Timer, retxBSR-Timer and logicalChannelSR-ProhibitTimer and by, for a logical channel, optionally signaling logicalChannelGroup which allocates the logical channel to an LCG.

In an example, for the buffer status reporting procedure, the MAC entity may consider radio bearers which are not suspended and may consider radio bearers which are suspended. In an example, a buffer status report (BSR) may be triggered if any of the following events occur: UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR may be referred below to as regular BSR; UL resources are allocated and number of padding bits is equal to or larger than the size of the buffer status report MAC control element plus its subheader, in which case the BSR is referred below to as padding BSR; retxBSR-Timer expires and the MAC entity has data available for transmission for any of the logical channels which belong to a LCG, in which case the BSR may be referred below to as regular BSR; periodicBSR-Timer expires, in which case the BSR may be referred below to as periodic BSR.

In an example, a MAC entity in a UE, for regular BSR, if the BSR is triggered due to data becoming available for transmission for a logical channel for which logicalChannelSR-ProhibitTimer is configured by upper layers: may start or restart the logicalChannelSR-ProhibitTimer; else: if running, may stop the logicalChannelSR-ProhibitTimer.

In an example, a MAC entity in a UE, for regular and periodic BSR: if more than one LCG has data available for transmission in the TTI where the BSR is transmitted: may report Long BSR; else may report Short BSR.

In an example, A MAC entity in a UE, for padding BSR: if the number of padding bits is equal to or larger than the size of the short BSR plus its subheader but smaller than the size of the long BSR plus its subheader: if more than one LCG has data available for transmission in the TTI where the BSR is transmitted: may report truncated BSR of the LCG with the highest priority logical channel with data available for transmission; else may report Short BSR. Else if the number of padding bits is equal to or larger than the size of the long BSR plus its subheader, may report long BSR.

In an example, if the buffer status reporting procedure determines that at least one BSR has been triggered and not cancelled: if the MAC entity has UL resources allocated for new transmission for this TTI: instruct the Multiplexing and Assembly procedure to generate the BSR MAC control element(s); start or restart periodicBSR-Timer except when the generated BSRs are Truncated BSRs; start or restart retxBSR-Timer. Else if a Regular BSR has been triggered and logicalChannelSR-ProhibitTimer is not running: if an uplink grant is not configured or the Regular BSR was not triggered due to data becoming available for transmission for a logical channel for which logical channel SR masking (logicalChannelSR-Mask) is setup by upper layers: a Scheduling Request may be triggered.

A MAC PDU may contain at most one MAC BSR control element, even when multiple events trigger a BSR by the time a BSR can be transmitted in which case the regular BSR and the periodic BSR may have precedence over the padding BSR.

The MAC entity may restart retxBSR-Timer upon indication of a grant for transmission of new data on any UL-SCH.

Triggered BSRs may be cancelled in case the UL grant(s) in this subframe can accommodate pending data available for transmission but is not sufficient to additionally accommodate the BSR MAC control element plus its subheader. Triggered BSRs may be cancelled when a BSR is included in a MAC PDU for transmission.

The MAC entity may transmit at most one regular/periodic BSR in a TTI. If the MAC entity is requested to transmit multiple MAC PDUs in a TTI, it may include a padding BSR in any of the MAC PDUs which do not contain a regular/periodic BSR.

BSRs transmitted in a TTI may reflect the buffer status after MAC PDUs have been built for this TTI. Each LCG may report at the most one buffer status value per TTI and this value may be reported in BSRs reporting buffer status for this LCG. A padding BSR may not be allowed to cancel a triggered regular/periodic BSR. A padding BSR is triggered for a specific MAC PDU only and the trigger is cancelled when this MAC PDU has been built.

An example scheduling request procedure is described here. The Scheduling Request (SR) may be used for requesting UL-SCH resources for new transmission. When an SR is triggered, it may be considered as pending until it is cancelled. Pending SR(s) may be cancelled and sr-ProhibitTimer may be stopped when a MAC PDU is assembled and this PDU includes a BSR which contains buffer status up to (and including) the last event that triggered a BSR, or, if pending SR(s) are triggered by Sidelink BSR, when a MAC PDU is assembled and this PDU includes a Sidelink BSR which contains buffer status up to (and including) the last event that triggered a Sidelink BSR, or, if pending SR(s) are triggered by Sidelink BSR, when upper layers configure autonomous resource selection, or when the UL grant(s) can accommodate pending data available for transmission.

If an SR is triggered and there is no other SR pending, the MAC entity may set the SR_COUNTER to 0. As long as one SR is pending, the MAC entity may for each TTI: if no UL-SCH resources are available for a transmission in this TTI: if the MAC entity has no valid PUCCH resource for SR configured in any TTI: may initiate a Random Access procedure on the SpCell and cancel pending SRs; else if the MAC entity has at least one valid PUCCH resource for SR configured for this TTI and if this TTI is not part of a measurement gap and if sr-ProhibitTimer is not running: if SR_COUNTER<dsr-TransMax: increment SR_COUNTER by 1; instruct the physical layer to signal the SR on one valid PUCCH resource for SR; start the sr-ProhibitTimer. Else: notify RRC to release PUCCH for serving cells; notify RRC to release SRS for serving cells; clear any configured downlink assignments and uplink grants; initiate a Random Access procedure (see subclause 5.1) on the SpCell and cancel pending SRs.

The selection of which valid PUCCH resource for SR to signal SR on when the MAC entity has more than one valid PUCCH resource for SR in one TTI is left to UE implementation.

FIG. 11 shows an example routing (mapping) restriction according to an example embodiment.

When routing restrictions for logical channels/bearers are configured, an example embodiment may enhance the BSR process to improve BSR trigger and reporting criteria. In the legacy LTE systems (release 13 and before), PDUs could be transmitted on any cell. In the legacy LTE systems (release 13 and before), when a UE receives an uplink grant on any cell the UE may transmit a TB of any of the logical channels employing uplink grant based on logical channel priorities and scheduling mechanisms implemented in the UE. The UE may not starve any of the logical channels because of the routing restrictions.

When routing restrictions for transmission of logical channels on a plurality of radio resource types are configured, the UE may consider the routing restrictions into account for transmission of data in logical channels. In an example, an eNB may need to receive more frequent BSR reports or BSR reports according to different trigger criteria to properly allocate to wireless devices radio resources of different types (e.g. LAA cells and/or licensed cells). An eNB may need to know about the BSR of various logical channels to efficiently allocate uplink grants of different radio resource types. When these factors are taken into account, there is a need to improve the BSR MAC mechanism to enhance uplink packet transmission and scheduling.

Example embodiments provide enhancements to improve BSR, SR and/or PHR mechanism described above. Example embodiments enable an eNB to receive timely BSR, SR, and/or PHR and enhance scheduling and/power control mechanisms in an eNB/UE.

Example embodiments may enhance SR mechanism in an eNB and/or UE, so that an eNB can efficiently allocate uplink grants in response to an SR. Example embodiments may enhance PHR process, and improve timely delivery of PHR to an eNB.

Example embodiments enhance uplink packet scheduling and/or power control in an eNB/UE. One or more improvements introduced in examples embodiments may be combined and implemented together to further increase efficiency of radio link and MAC mechanisms.

For example, in the current MAC mechanism, the handling of retxBSR-Timer may not provide an efficient mechanism for BSR transmission when routing restrictions are configured.

In the current release of LTE technology, a Buffer Status Report (BSR) may be triggered if the following event occur: retxBSR-Timer expires and the MAC entity has data available for transmission for logical channels which belong to a LCG, in which case the BSR may be referred below to as Regular BSR. If the buffer status reporting procedure determines that at least one BSR has been triggered and not cancelled, if the MAC entity has UL resources allocated for new transmission for this TTI: start or restart periodicBSR-Timer except when the generated BSRs are Truncated BSRs; start or restart retxBSR-Timer. The MAC entity may restart retxBSR-Timer upon indication of a grant for transmission of new data on any UL-SCH.

For example, in the current mechanism, the MAC entity may restart retxBSR-Timer upon indication of a grant for transmission of new data on any UL-SCH. In an example, the UE may frequently receive uplink grants on uplink resources of a first radio resource type (e.g. on LAA cells), and may restart retxBSR-Timer. This may prevent BSR to be triggered due to retxBSR-Timer, while the UE buffer for logical channels that can be mapped on radio resources of a second type (e.g. licensed cells) include data. The eNB may not receive adequate BSR for logical channels that are mapped to second radio resources type, and may not be able to enhance uplink scheduling and efficiently transmit efficient uplink grants for transmission of uplink packets in different logical channels. Example embodiments may improve retxBSR-Timer management in a UE.

In an example embodiment, the MAC entity may restart retxBSR-Timer upon indication of a grant for transmission of new data on any UL-SCH via a second radio resource type (e.g. licensed cell). The MAC entity may restart retxBSR-Timer upon indication of a grant for transmission of new data on any UL-SCH via a first radio resource type (e.g. unlicensed cell) when the configured LCs can be scheduled on the first radio resource type (e.g. unlicensed cell). When one or more logical channels are configured for transmission only via a second radio resource type (e.g. licensed cell), the MAC entity may not restart retxBSR-Timer upon indication of a grant for transmission of new data on a UL-SCH via the first radio resource type (e.g. unlicensed cell). When the configured LCs can be transmitted on both first and second radio resource types, the MAC entity may restart retxBSR-Timer upon indication of a grant for transmission of new data on any UL-SCH.

In an example embodiment, the MAC entity may restart retxBSR-Timer upon indication of a grant for transmission of new data on any UL-SCH via a second radio resource type (e.g. licensed cell). The MAC entity may restart retxBSR-Timer upon indication of a grant for transmission of new data on any UL-SCH on a first radio resource type (e.g. unlicensed cell) when the configured LCs having buffered data can be scheduled on the first radio resource type (e.g. unlicensed cell). When one or more logical channels are configured for transmission only via the second radio resource type (e.g. licensed cell) and include data in their corresponding buffer, the MAC entity may not restart retxBSR-Timer upon indication of a grant for transmission of new data on a UL-SCH on via the first radio resource type (e.g. unlicensed cell). When the configured LCs can be transmitted on both radio resource types, the MAC entity may restart retxBSR-Timer upon indication of a grant for transmission of new data on any UL-SCH.

In an example embodiment, the MAC entity may restart retxBSR-Timer upon indication of a grant for transmission of new data on any UL-SCH via second radio resource type (e.g. licensed cell). The MAC entity may not restart retxBSR-Timer upon indication of a grant for transmission of new data on any UL-SCH via the first radio resource type (e.g. unlicensed cell). This example implementation is simpler to implement, but may result in more frequent BSR transmission.

In an example embodiment, two retxBSR-Timers may be configured, one for first logical channels mapped to at least one first radio resource type and one for second logical channels mapped to at least one second radio resource type (e.g. retxBSR-Timer1 and retxBSR-Timer2). For example, retxBSR-Timer1 may be restarted when a grant is received for one of the at least one first radio resource type (e.g. unlicensed cell). retxBSR-Timer2 may restart when a grant is received for one of the at least one second radio resource type (e.g. licensed cell). In an example, if any of the timers retxBSR-Timer1 and retxBSR-Timer2 expire, a BSR transmission may be triggered. Timers retxBSR-Timer1 and retxBSR-Timer2 may restart when a BSR is transmitted, wherein the BSR comprises indication of data comprising data of the at least one first logical channel and indication of data comprising data of the at least one second logical channel. In an example, if the timer retxBSR-Timer1 expires, a BSR may be triggered for transmission of a BSR including indication of amount of data comprising data of at least the at least one first logical channels. If the timer retxBSR-Timer2 expires, a BSR may be triggered for transmission of a BSR including indication of amount of data comprising data of at least the at least one second logical channels.

In an example, retxBSR-Timer1 may restart if the BSR includes indication of amount of data of at least the at least one first logical channels mapped to the first radio resource type. retxBSR-Timer2 may restart if the BSR includes indication of amount of data of at least the at least one second logical channels mapped to the second radio resource type. At least one RRC message configuring one or more cells may comprise a first value for retxBSR-Timer1 and a second value for retxBSR-Timer2. A wireless device may transmit a BSR MAC CE in an uplink grant when a BSR is triggered. A wireless device may trigger and transmit an SR when no uplink grant is available. The eNB may transmit to the wireless device an uplink grant in response to receiving the SR. The wireless device may transmit a BSR MAC CE in an uplink grant when a BSR is triggered.

A wireless device may receive one or more messages (e.g. RRC messages) comprising configuration parameters for a plurality of cells and for a plurality of logical channels comprising a first logical channel. The configuration parameters indicate a first mapping restriction of the first logical channel to at least one first radio resource types in a plurality of radio resource types. The wireless device receives an uplink grant indicating radio resources of a radio resource type in the plurality of radio resource types. The wireless device restart a first buffer status report (BSR) retransmission timer in response to the uplink grant meeting first criteria. The first BSR retransmission timer is employed for triggering a BSR indicating an amount of data comprising data of a buffer of the first logical channel. The first criteria comprise the radio resource type being of one of the at least one first radio resource type. The wireless device may restart the first BSR retransmission timer in response to transmitting a BSR that comprises a report for a buffer of a first logical channel that triggered the BSR. In an example, the wireless device may not restart a first buffer status report (BSR) retransmission timer in response to transmitting a BSR, when the BSR does not comprise a report for a buffer of a first logical channel that triggered the BSR.

The wireless device may restart a second BSR retransmission timer in response to the uplink grant meeting second criteria. The second BSR retransmission timer is employed for triggering a BSR indicating an amount of data comprising data of a buffer of a second logical channel. The second criteria may comprise the radio resource type being of at least one second radio resource type.

The wireless device may trigger a BSR transmission in response to the first BSR retransmission timer expiring. The wireless device may receive an uplink grant from the base station. The wireless device may transmit a transport block comprising a BSR to the base station.

In an example, the radio resource type indicates a cell type. The cell type comprises at least one of the following: a licensed cell type and an unlicensed cell type. The mapping restriction may be based, at least in part, on one or more quality of service (QoS) requirements of the logical channel. A QoS requirement is based on a latency requirement of the logical channel. The logical channel is configured with a priority and a prioritized bit rate (PBR). The at least one message comprises a parameter indicating a value for the first BSR retransmission timer.

For example, in the current MAC mechanism, the handling of retxBSR-Timer may not provide an efficient mechanism for BSR transmission when routing restrictions are configured. In the current LTE implementation, a buffer status report (BSR) may be triggered if any of the following events occur: retxBSR-Timer expires and the MAC entity has data available for transmission for any of the logical channels which belong to a LCG, in which case the BSR may be referred below to as regular BSR. If the buffer status reporting procedure determines that at least one BSR has been triggered and not cancelled, if the MAC entity has UL resources allocated for new transmission for this TTI: start or restart periodicBSR-Timer except when the generated BSRs are truncated BSRs; start or restart retxBSR-Timer. The MAC entity may restart retxBSR-Timer upon indication of a grant for transmission of new data on any UL-SCH.

For example, in the current mechanism, the MAC entity may restart retxBSR-Timer upon transmission of a truncated BSR. In an example, the truncated BSR may include the BSR for the logical channel group with the highest priority. In an example, the truncated BSR may include BSR of the buffers that are mapped only to a second radio resource type. In an example, the truncated BSR may not include BSR of the buffers that are mapped to both a first radio resource type and a second radio resource type. Such a BSR may not provide enough information to eNB for scheduling. The eNB may then schedule resources on the second radio resource type, since it may not receive adequate information about logical channels that could be transmitted on the first radio resource type. In an example embodiment, BSR mechanism may be improved to enhance BSR transmission so that an eNB receives adequate BSR reports from logical channels in example scenarios.

In an example embodiment, the start or restart retxBSR-Timer process may be enhanced. In an example embodiment, if the buffer status reporting procedure determines that at least one BSR has been triggered and not cancelled, if the MAC entity has UL resources allocated for new transmission for this TTI, the UE may start or restart retxBSR-Timer corresponding to a logical channel (or LGC) when the BSR includes an indication of the data of the logical channel (or LGC). For example, the UE may not start or restart retxBSR-Timer when the generated BSRs are Truncated BSRs. In legacy mechanism, periodicBSR-Timer and retxBSR-Timer are treated differently. In an example embodiment, additional restriction is added to further limit the start or restart of retxBSR-Timer.

In an example embodiment, if the buffer status reporting procedure determines that at least one BSR has been triggered and not cancelled, if the MAC entity has UL resources allocated for new transmission for this TTI, the UE may start or restart retxBSR-Timer except: when the generated BSRs are Truncated BSRs and UE has available data for a LC type and BSR for that logical channel type is not reported in the truncated BSR.

In an example embodiment, if the buffer status reporting procedure determines that at least one BSR has been triggered and not cancelled, if the MAC entity has UL resources allocated for new transmission for this TTI, the UE may start or restart retxBSR-Timer except: when the generated BSRs are Truncated BSRs and UE is configured with logical channels that can only be transmitted on the second radio resource type.

In an example embodiment, if the Buffer Status reporting procedure determines that at least one BSR has been triggered and not cancelled, if the MAC entity has UL resources allocated for new transmission for this TTI, the UE may start or restart retxBSR-Timer except: when the generated BSRs are Truncated BSRs and UE is configured with at least two types of logical channels with different routing restrictions. Other similar examples may be provided to introduce additional exceptions for start or restarting retxBSR-Timer when a truncated BSR is reported.

In the current LTE-A MAC specifications, a Buffer Status Report (BSR) may be triggered if any of the following events occur: UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR may be referred below to as Regular BSR; UL resources are allocated and number of padding bits is equal to or larger than the size of the Buffer Status Report MAC control element plus its subheader, in which case the BSR is referred below to as Padding BSR; retxBSR-Timer expires and the MAC entity has data available for transmission for any of the logical channels which belong to a LCG, in which case the BSR may be referred below to as Regular BSR; periodicBSR-Timer expires, in which case the BSR may be referred below to as Periodic BSR.

The existing mechanism does not consider routing restrictions for logical channels. There is a need to trigger BSR depending when UL data becomes available on a logical channel and depending on routing restriction configuration of the logical channel and other logical channel which data is already available for transmission. Example mechanisms improve BSR trigger mechanism to provide adequate BSR information to the eNB. This mechanism may enhance uplink scheduling in an eNB.

In the current MAC algorithm, regular BSR is triggered when: UL data, for a logical channel which belongs to a LCG, becomes available for transmission and either the data belongs to a logical channel with higher priority than the priorities of the logical channels which belong to any LCG and for which data is already available for transmission, or there is no data available for transmission for any of the logical channels which belong to a LCG.

In an example embodiment, regular BSR is triggered when: UL data, for a logical channel which belongs to a LCG, becomes available for transmission and either the data belongs to a logical channel that can be transmitted on first and second radio resource types and the logical channels which belong to any LCG and for which data is already available for transmission can be only transmitted on the second radio resource type, or the data belongs to a logical channel that can only be transmitted on the second radio resource type and the logical channels which belong to any LCG and for which data is already available for transmission can be transmitted on the first and second radio resource type, or there is no data available for transmission for any of the logical channels which belong to a LCG.

In an example embodiment, enhanced mechanisms may be combined with legacy mechanisms. The example embodiments may trigger a BSR when data becomes available for a logical channel with a first routing restriction that is different from the routing restriction of other logical channels with data. This process may be combined with logical channel priorities.

In an example embodiment, regular BSR is triggered when: for logical channels with a first routing restriction (e.g. transmission only on licensed cells): UL data, for a logical channel which belongs to a LCG, becomes available for transmission and either the data belongs to a logical channel with higher priority than the priorities of the logical channels which belong to any LCG and for which data is already available for transmission, or there is no data available for transmission for any of the logical channels which belong to a LCG. Regular BSR is triggered when: for logical channels with a second routing restriction (e.g. transmission on licensed/LAA cells): UL data, for a logical channel which belongs to a LCG, becomes available for transmission and either the data belongs to a logical channel with higher priority than the priorities of the logical channels which belong to any LCG and for which data is already available for transmission, or there is no data available for transmission for any of the logical channels which belong to a LCG.

In an example embodiment, regular BSR is triggered when: UL data, for a logical channel which belongs to a LCG, becomes available for transmission on a logical channel with a first routing restriction and either the data belongs to a logical channel with a different routing restriction than the routing restriction of the logical channels which belong to any LCG and for which data is already available for transmission, or there is no data available for transmission for any of the logical channels which belong to a LCG.

The wireless device receives one or more messages comprising configuration parameters for a plurality of cells and a plurality of logical channels comprising a logical channel. The configuration parameters indicate a mapping restriction of the logical channel to one or more radio resource types in a plurality of radio resource types. The wireless device triggers a buffer status report (BSR) transmission when data becomes available for the logical channel with the mapping restriction and when a selected set of one or more logical channels with the same mapping restriction meet a first criteria. In an example, the first criteria comprise: the selected set of one or more logical channels with the same mapping restriction do not include uplink buffer data. In an example, the first criteria comprise: the selected set of one or more logical channels with the same mapping restriction do not include uplink buffer data; the logical channel has a higher priority than the selected set of one or more logical channels.

In an example, buffers of logical channels that have the same mapping restriction (e.g. mapped to the same one or more radio resource types) are considered for determining whether a BSR is triggered. In an example one or more first logical channels are mapped to one or more first radio resource type and one or more second logical channels are mapped to one or more second radio resource type.

For example, a first buffer status report is triggered based on availability of data in at least one of one or more first logical channels, and independent of availability of data in the one or more second logical channels. The condition for triggering a first BSR may depends on availability of new data on a first logical channel with a mapping restriction and may also depend of availability of existing data in other logical channels with the same mapping restriction.

A second buffer status report may be triggered based on availability of data in at least one of one or more second logical channels, and independent of availability of data in the one or more first logical channels. The condition for triggering a first BSR may depends on availability of new data on a second logical channel a mapping restriction and may also depend of availability of existing data in other logical channels with the same mapping restriction.

The wireless device receives an uplink grant indicating radio resources of a first radio resource type. The wireless device constructs a transport block comprising the BSR. The wireless device transmits the transport block via the radio resources of the first radio resource type.

In an example, the radio resource type indicates a cell type. The cell type comprises at least one of the following: a licensed cell type and an unlicensed cell type. The mapping restriction is based, at least in part, on one or more quality of service (QoS) requirements of the logical channel. A QoS requirement is based on a latency requirement of the logical channel. The logical channel is configured with a priority and a prioritized bit rate (PBR).

In the current SR process, when an SR is triggered, it may be considered as pending until it is cancelled. Pending SR(s) may be cancelled and sr-ProhibitTimer may be stopped when a MAC PDU is assembled and this PDU includes a BSR which contains buffer status up to (and including) the last event that triggered a BSR, or when the UL grant(s) can accommodate pending data available for transmission.

When an eNB receives an SR signal from a UE, the eNB provides an uplink grant to the UE. In the current LTE mechanism, there is no restriction on routing restriction of logical channels on different cells, and the eNB may grant uplink grant on any of the configured and activated cells.

When routing restrictions are configured, data buffered in some of the logical channels may not be configured for transmission on a first radio resource type.

In an example embodiment, an eNB scheduling mechanism may be enhanced in response to a received SR. The example embodiment may enhance eNB scheduling mechanism and may reduce uplink packet transmission delay when an SR is triggered.

In an example embodiment, if an SR is triggered and the eNB receives an SR from a UE and when eNB/UE configures at least one LC that can only be transmitted on a second radio resource type, then eNB grants UL resources on the second radio resource type in response to SR. In an example embodiment, the eNB may employ LC/bearer configuration in determining to transmit uplink grants on a first radio resource type or a second radio resource type. For example, when eNB/UE is configured with one or more LCs that can only be transmitted on the second radio resource type, the eNB may grant uplink resources on the second radio resource type in response to an SR. For example, when eNB/UE is configured with one or more LCs that can be transmitted on both the first and second radio resource type, the eNB may grant uplink resources on either the first radio resource type and/or the second radio resource type in response to an SR.

In an example implementation, when a UE triggers/transmits SR in response to data on a buffer of a LC that can only be transmitted on the second radio resource type, the UE may not cancel SR process and may maintain the SR process pending, when the UE receives a grant on the first radio resource type.

In an example implementation, when a UE triggers/transmits SR in response to data on a buffer of a LC that can only be transmitted on a second radio resource type, the UE may transmit BSR in the uplink grant and cancel SR, when the UE receives grant on the first radio resource type and/or the second radio resource type.

In an example embodiment, the Buffer Status Reporting may be important for UL scheduling, and contains the buffer status for the signaling messages e.g. measurement report (which is related to the handover) and/or data. The loss of the BSR may impact UE performance. The Power Headroom Reporting may provide the serving eNB with information about the difference between the nominal UE maximum transmit power and the estimated power for UL-SCH transmission per activated Serving Cell, which is also essential for UL scheduling. In an example embodiment, the BSR and PHR MAC CE may be configured to be sent only over the second radio resource type.

The following example routing restrictions for MAC CEs alternatives may be considered: A MAC CE is sent on the first radio resource type when no grant is received for the second radio resource type. In an example, if MAC CEs are sent on the first radio resource type they may be delayed more than they would be if they were sent on the second radio resource type. In an example, when grants are received on both first and second radio resource types, the UE may transmit the MAC CE on the second radio resource type.

In an example, the UE may not consider a MAC CE transmitted until the UE has received an ACK for it, hence the UE may resend this MAC CE on another radio resource type (e.g. licensed cell). While this would result in the shortest delay, it may complicate MAC BSR and PHR timer managements. When the UE gets two grants; one on the first radio resource type an one on the second radio resource type then the UE may send the MAC CEs on the second radio resource type. This example implementation may enable that the UE is not blocking MAC CEs from being transmitted on the first radio resource type, further it enables that if the UE gets scheduled on both first and second radio resource types then the UE may prioritize to send MAC CEs on the second radio resource type. In an example embodiment, MAC CEs may be sent on first or second radio resource types. In an example, if the UE has valid grants both for first and second radio resource types, the UE may send MAC CEs on the second radio resource type.

In an example embodiment, an eNB may transmit one or more RRC messages to configure routing restriction for transmission of MAC CEs in the uplink. In an example embodiment, routing restriction for transmission of MAC CEs in the uplink may be preconfigured (pre-specified in the UE/eNB). For example, the UE may transmit one or more MAC CEs only on a second radio resource type.

When BSR can only be transmitted on a specific radio resource type, BSR mechanisms may need to be enhanced to ensure that the eNB receives adequate BSR and is enabled to provide efficient uplink scheduling to UEs.

In an example embodiment, if the Buffer Status reporting procedure determines that at least one BSR has been triggered and not cancelled: if the MAC entity has UL resources allocated for new transmission on at least one second radio resource type for this TTI, the MAC entity may: instruct the Multiplexing and Assembly procedure to generate the BSR MAC control element(s); start or restart periodicBSR-Timer except when the generated BSRs are Truncated BSRs; and/or start or restart retxBSR-Timer; else if a Regular BSR has been triggered and logicalChannelSR-ProhibitTimer is not running: if an uplink grant is not configured or the Regular BSR was not triggered due to data becoming available for transmission for a logical channel for which logical channel SR masking (logicalChannelSR-Mask) is setup by upper layers: the UE may trigger a Scheduling Request. In an example embodiment, when BSR are triggered and UE does not have a grant on a second radio resource type, the UE may trigger a Scheduling Request (if the Scheduling Request is configured, e.g. not masked, for the logical channel triggering the BSR).

In an example embodiment, when BSR is triggered due to traffic on logical channels routable to both first and second radio resource types (or when UE has data only on logical channels routable to both first and second radio resource types), the UE may not trigger SR for transmission of BSR when the UE receives uplink grants on the first radio resource type. The UE may transmit a MAC PDU on the first radio resource type in response to the uplink grant.

In an example embodiment, when PHR is triggered and UE does not have a grant on a second radio resource type, the UE may trigger a Scheduling Request. A UE may not be configured to transmit the PHR on a first radio resource type. The UE may trigger an SR for transmission of PHR. The UE may receive uplink grants and transmit PHR in response to the uplink grant. In an example embodiment, the UE may cancel the SR when the grant is received on the second radio resource type, otherwise the UE may maintain the SR process pending.

In an example embodiment, when PHR is triggered and UE does not have a grant on a second radio resource type, the UE may trigger a Scheduling Request when the UE receives grants on the first radio resource type. PHR may have useful information for the eNB uplink scheduling and power control. SR may not be triggered for PHR if UE does not receive any uplink grants. A UE may not be configured to transmit the PHR on the first radio resource type. The UE may trigger an SR for transmission of PHR when it receives uplink grants on the first radio resource type. The UE may receive uplink grants on a second radio resource type and transmit PHR in response to the uplink grant. In an example embodiment, the UE may cancel the SR when the grant is received on a second radio resource type, otherwise the UE may maintain the SR process pending.

In an example embodiment, a wireless device may receive one or more messages (e.g. RRC messages) comprising configuration parameters for a plurality of cells and for a plurality of logical channels. The configuration parameters may indicate a mapping restriction of a logical channel to one or more radio resource types in a plurality of radio resource types. When a logical channel is mapped to one or more radio resource types, data in the buffer of the logical channel can only be transmitted via the one or more radio resource types.

In an example, the wireless device may trigger a first scheduling request (SR) process for uplink transmissions requiring uplink resources of at least one first radio resource type. For example, uplink transmissions may be for data in a logical channel mapped to the at least one first radio resource type. For example, uplink transmissions may be for a MAC CE and/or a control message/signaling that requires resources of at least one first radio resource type. The uplink transmissions may comprise one or more transport blocks. The uplink transmissions may comprise one or more media access control (MAC) control elements. The one or more messages indicate a first mapping restriction of the uplink transmissions to uplink resources of the at least one first radio resource type.

In an example, the wireless device, in response to triggering the first scheduling request (SR) process, may transmit to the base station a first SR signal on an uplink control channel and the wireless device may start a first scheduling request prohibit timer. The first SR signal may indicate that the wireless device requires radio resources of at least one first radio resource type. In an example, the base station may determine that the first SR signal is for a request for the at least one first radio resource type based on the at least one message (RRC signaling) transmitted to the wireless device. In an example, the one or more messages indicate that the uplink transmissions require uplink resources of the at least one first radio resource type.

The at least one message may comprise configuration parameters of scheduling resources in an uplink physical control channel. The wireless device receives from a base station an uplink grant indicating uplink radio resources. An uplink grant may be received via the base station transmitting a DCI on the downlink physical control channel. The DCI may comprise the uplink grant indicating uplink resource blocks, transmission format and scheduling information and/or radio resource type for an uplink transmission.

In an example embodiment, the wireless device may cancel the first SR process if the uplink radio resources are of the one of the at least one first radio resource type. Otherwise, the wireless device may maintain the first SR process pending. The wireless device transmits one or more transport blocks via the uplink radio resources. The wireless device may monitor at least one downlink control channel for subsequent uplink grants. The wireless device may cancel the SR process when the wireless device transmits the uplink transmissions (that triggered the first SR process) employing an uplink grant. In an example, the wireless device may cancel the first SR process when the wireless device transmits a BSR that comprises information about an amount of data in a logical channel that triggered the first SR process.

In an example, the one or more transport blocks comprises the uplink transmissions if the uplink radio resources are of one of the at least one first radio resource type. In an example, the radio resource type may indicate a cell type. In an example, the cell type comprises at least one of the following: a licensed cell type and an unlicensed cell type.

Example power headroom trigger condition configuration parameters in an RRC message are shown below. Other examples may be implemented. phr-Config CHOICE {release NULL, setup SEQUENCE {periodicPHR-Timer ENUMERATED {sf10, sf20, sf50, sf100, sf200, sf500, sf1000, infinity}, prohibitPHR-Timer ENUMERATED {sf0, sf10, sf20, sf50, sf100, sf200, sf500, sf1000}, dl-PathlossChange ENUMERATED {dB1, dB3, dB6, infinity}}

The parameter periodicPHR-Timer may be a timer for PHR reporting. Value in number of sub-frames. Value sf10 corresponds to 10 subframes, sf20 corresponds to 20 subframes and so on.

The parameter prohibitPHR-Timer may be a timer for PHR reporting. Value in number of sub-frames. Value sf0 corresponds to 0 subframes, sf100 corresponds to 100 subframes and so on.

The parameter dl-PathlossChange may be DL Pathloss Change and the change of the required power backoff due to power management (as allowed by P-MPRc) for PHR reporting. Value in dB. Value dB1 corresponds to 1 dB, dB3 corresponds to 3 dB and so on. The same value may apply for each serving cell (although the associated functionality is performed independently for each cell).

A Power Headroom reporting procedure may be employed to provide a serving eNB with information about the difference between nominal UE maximum transmit power and estimated power for UL-SCH transmission per activated serving cell. The Power Headroom reporting procedure may also to provide a serving eNB with information about the difference between the nominal UE maximum power and the estimated power for an UL-SCH and PUCCH transmission on a SpCell and/or a PUCCH SCell.

The reporting period, delay and mapping of Power Headroom may be defined. An RRC may control Power Headroom reporting by configuring at least two timers periodicPHR-Timer and prohibitPHR-Timer, and by signaling dl-PathlossChange which may set the change in measured downlink pathloss and the power backoff due to power management (as allowed by P-MPRc) to trigger a PHR.

In an example embodiment, a Power Headroom Report (PHR) may be triggered if one or more of the following events occur (not listed in any particular order). First, a prohibitPHR-Timer expires or has expired and the path loss has changed more than dl-PathlossChange dB for at least one activated serving cell of any MAC entity which is used as a pathloss reference since the last transmission of a PHR in this MAC entity when the MAC entity has UL resources for new transmission. Second, a periodicPHR-Timer expires. Third, upon configuration or reconfiguration of the power headroom reporting functionality by upper layers, which is not used to disable the function. Fourth, activation of an SCell of any MAC entity with a configured uplink; Fifth, addition of an PSCell; and/or sixth, a prohibitPHR-Timer expires or has expired, when the MAC entity has UL resources for a new transmission, and the following is true in this TTI for any of the activated serving cells of any MAC entity with a configured uplink (there may be UL resources allocated for transmission or there may be a PUCCH transmission on this cell, and the required power backoff due to power management (as allowed by P-MPRc) for this cell has changed more than dl-PathlossChange dB since the last transmission of a PHR when the MAC entity had UL resources allocated for transmission or PUCCH transmission on this cell).

In an example implementation, the MAC entity may avoid triggering a PHR when the required power backoff due to power management decreases temporarily (e.g. for up to a few tens of milliseconds) and it may avoid reflecting such temporary decrease in the values of PCMAX,c/PH when a PHR is triggered by other triggering conditions.

If the MAC entity has UL resources allocated for a new transmission for this TTI, the MAC entity may start a periodicPHR-Timer if it is the first UL resource allocated for a new transmission since the last MAC reset. A UE may transmit a corresponding PHR report if a Power Headroom reporting procedure determines that at least one PHR has been triggered and not cancelled, and if the allocated UL resources can accommodate a corresponding PHR MAC control element plus its subheader for a corresponding PHR configuration as a result of logical channel prioritization.

For example, a UE may transmit a corresponding PHR report for one or more activated serving cells with a configured uplink if: the allocated UL resources can accommodate a PHR MAC control element plus its subheader if neither extendedPHR nor dualConnectivityPHR is configured, and/or an Extended PHR MAC control element plus its subheader if an extendedPHR is configured, and/or a Dual Connectivity PHR MAC control element plus its subheader if dualConnectivityPHR is configured as a result of logical channel prioritization.

In LTE Release-10 carrier aggregation (CA), an Extended Power Headroom Report (PHR) MAC Control Element (CE) was introduced to accommodate type 2 power headroom (PH) of PCell and type 1 PHs of SCells. Type 2 PH may be employed when simultaneousPUCCH-PUSCH configuration is supported. In DC, since a PUCCH may be transmitted on a PCell and an PSCell, the PHR MAC CE may contain 2 type 2 PHs and several type 1 PHs. DC PHR MAC CE was introduced to include an extra type 2 PH of a PSCell. For DC, PH may be reported to both eNBs separately, but the PHR may include PH for active serving cells.

In LTE Release-12, three types of power headroom related MAC CEs are defined: 1) a Power Headroom Report MAC CE, 2) An Extended Power Headroom Report MAC CE, and 3) Dual Connectivity Power Headroom. A MAC CE may be identified by a logical channel ID (LCID) field in a MAC subheader. The LCID field may identify the logical channel instance of the corresponding MAC SDU and/or the type of the corresponding MAC control element and/or padding.

Values of LCID for UL-SCH MAC CE in Release-12 are defined in 3GPP TS 36.321 V12.4.0 as: Index 11000: Dual Connectivity Power Headroom Report; Index 11001: Extended Power Headroom Report; and Index 11010: Power Headroom Report If an extendedPHR mode is configured and when conditions for transmission of a PHR are met, a UE may generate and transmit an Extended PHR MAC control element identified by, for example, LCID=11001.

If a dualConnectivityPHR mode is configured and when conditions for transmission of a PHR are met, a UE may generate and transmit a Dual Connectivity Power Headroom Report identified by, for example, LCID=11000.

If a PHR is configured but neither extendedPHR mode nor dualConnectivityPHR mode is configured, and when conditions for transmission of a PHR are met, then a UE may generate and transmit a Power Headroom Report with, for example, an LCID of 11010.

LTE Release-12 does not appear to address configuration, message format, trigger conditions, and message processing for power headroom when a PUCCH SCell with simultaneous PUCCH+PUSCH transmissions is configured in a UE (without configuring DC in the UE). A Release-12 Dual Connectivity Power Headroom Report may not be applicable in such a scenario, since dual connectivity may not be configured in the UE. A Release-12 Extended Power Headroom Report may not be applicable since it does not appear to support transmission of two Type 2 power headrooms when PUCCH groups are configured. A Release-12 Power Headroom Report report may not be applicable since it appears to support only one serving cell. There may be a need for enhancing the power headroom implementation to efficiently support PUCCH group configuration. There may also be a need for enhancing the power headroom implementation to enhanced cell configurations not supported by existing PHR formats.

A new PHR may be called an extendedPHR2 MAC CE and/or an extended cell configuration PHR MAC CE and/or a new extended PHR MAC CE. The new PHR may also be called by other names (e.g. PUCCH group PHR MAC CE, enhanced configuration MAC CE, 32 cell PHR MAC CE, etc., and/or the like). An ExtendedPHR2 MAC CE may also support additional features in addition to PUCCH groups. For example, an ExtendedPHR2 MAC CE may support more than 5 cells including a primary cell and more than k secondary cells (e.g. k=4, 7, etc., may support up to 32 cells) and/or many other features.

The number of used MAC LCIDs may increase if a new PHR MAC CE command format with a new MAC LCID is implemented for an extendedPHR2. A MAC LCID may be included in a MAC subheader. In an example embodiment, an existing MAC LCID may be employed for an extendedPHR2 (e.g. LCID of Extended PHR). A UE may transmit PHR MAC CEs to an eNB in unicast messages. Both the UE and the eNB may have information about the current RRC configurations of the UE. The UE may use the same LCID for or one or more PHR transmissions and the UE may identify the format of the PHR based on RRC configuration parameters.

This enhancement may not require introducing a new LCID for an extendedPHR2. Two different power headroom MAC CEs may use the same LCID. This mechanism may reduce the number of LCIDs used in the MAC layer (compared with the scenario wherein a new LCID is introduced) and may further simplify a UE implementation. RRC configuration parameters in addition to an LCID may be employed to determine the format of the PHR MAC CE.

A UE may consider UE RRC cell configurations to decide the format of a PHR MAC CE. For example, if a UE is configured with a first RRC configuration for a plurality of cells (e.g. 5 cells) of an eNB with no configured PUCCH SCell, then the fields in the MAC CE may be updated using processes related to an extendedPHR power headroom. If a UE is configured with PUCCH groups, then the fields in the MAC CE may be updated using processes related to an extendedPHR2 PHR. On the other hand, an eNB receiving the PHR MAC CE may have information about the RRC configuration of the UE transmitting the PHR MAC CE, and may interpret the PHR MAC CE fields based on the corresponding RRC configuration.

An eNB may transmit one or more RRC configuration parameters comprising configuration parameters of one or more cells. The configuration parameters for a cell may comprise configuration parameters for power headroom. The UE may use RRC configuration parameters to determine which type of the PHR headroom the UE should transmit.

In an example embodiment, a UE may transmit its capability regarding supporting simultaneousPUCCH-PUSCH to the eNB in an RRC UE Capability IE. For example: simultaneousPUCCH-PUSCH-r10 ENUMERATED {supported} OPTIONAL. The eNB may then configure simultaneousPUCCH-PUSCH for PCell and/or PUCCH SCell using information elements in RRC control messages. For example: simultaneousPUCCH-PUSCH ENUMERATED {true} OPTIONAL, Need OR. simultaneousPUCCH-PUSCH IE may indicate whether simultaneous PUCCH and PUSCH transmissions is configured in a PUCCH group. In an example, E-UTRAN may configure this field, when the nonContiguousUL-RA-WithinCC-Info is set to supported in the band on which PCell (or e.g. PUCCH SCell) is configured.

In LTE-A release 12 and before, Type 2 power headroom is reported when simultaneousPUCCH-PUSCH is configured for a given cell, for example PCell or PSCell. PCell and PSCell are always active after they are configured. When simultaneousPUCCH-PUSCH is configured, Type 1 and Type 2 PH fields for PCell and PSCell are included in the PHR report. simultaneousPUCCH-PUSCH may be configured for PUCCH SCell. In Release 12 and before, the presence of Type2 PH depends on the simultaneousPUCCH-PUSCH configuration. If a UE is not configured with simultaneousPUCCH-PUSCH, the UE transmits UCI on PUSCH and the parallel transmission of PUCCH and PUSCH does not occur. In this case, the UE does not transmit Type2 PH in the PHR report. When a UE is configured with simultaneousPUCCH-PUSCH, the UE may transmit UCI on PUCCH when PUSCH resource is allocated. In this case, the UE transmits Type2 PH in the PHR report.

In 3GPP RAN2 meeting number 91 in September 2015, it was agreed that presence of Type 2 PH for both PCell and PUCCH SCell follows the configuration of simultaneousPUCCH-PUSCH of the corresponding PUCCH. If simultaneousPUCCH-PUSCH is not configured for a PUCCH group, then Type 2 PH is not reported for that group. This mechanism may create inefficiencies and/or issues when multiple PUCCH groups are configured. This mechanism may not provide adequate transmit power information to the eNB for an efficient uplink scheduling and power control. When multiple PUCCH groups are configured and when simultaneousPUCCH-PUSCH is not configured for a cell group, parallel transmission of PUSCH and UCI may still be possible. In an example embodiment, UCI in one PUCCH group may be transmitted in parallel with PUSCH in another PUCCH group. There is a need to improve mechanisms for transmission of Type 2 PHR for the PCell and PUCCH SCell based on RRC configuration parameters when PUCCH groups are configured.

When PUCCH groups are configured, UCI multiplexing on PUSCH is on per PUCCH group basis. The simultaneous transmission of PUCCH and PUSCH may occur when UE is configured with PUCCH SCell and simultaneousPUCCH-PUSCH is not configured.

In an example embodiment, when PUCCH groups are configured, UCI on PUSCH is performed per PUCCH group. A UE may multiplex UCIs of a primary PUCCH group on the PUSCH of a serving cell in primary PUCCH group. A UE may not multiplex UCIs of primary PUCCH group on PUSCH of a serving cell in secondary PUCCH group. A UE may multiplex UCIs of a secondary PUCCH group on the PUSCH of a serving cell in the secondary PUCCH group. A UE may not multiplex UCIs of a secondary PUCCH group on PUSCH of a serving cell in another PUCCH group, e.g. the primary PUCCH group.

When PUCCH groups are configured, the configuration of simultaneousPUCCH-PUSCH may be configured independently on PCell or PUCCH SCell. For example, the parameter simultaneousPUCCH-PUSCH may be configured on both PCell and PUCCH SCell (set as true). For example, simultaneousPUCCH-PUSCH may be configured for one of PCell or PUCCH SCell. Or in another example, simultaneousPUCCH-PUSCH may not be configured on either PCell or PUCCH SCell.

In an example embodiment, independent of whether simultaneousPUCCH-PUSCH is configured (set to true) or not, UCI in one cell group may be transmitted in PUCCH of one cell group, in parallel with PUSCH transmission in another cell group. Even when simultaneousPUCCH-PUSCH is configured for neither PCell nor PUCCH SCell, parallel transmission of PUCCH and PUSCH is still possible. If UE is configured with PUCCH SCell, simultaneous transmission of PUCCH and PUSCH may occur independent of the configuration of simultaneousPUCCH-PUSCH on either PCell or PUCCH SCell.

According to the current agreement, a PHR may be reported without any Type 2 PH even if PUCCH can be transmitted in the same subframe as PUSCH. Such PHR transmission mechanism may not provide adequate power headroom information to eNB for an efficient uplink power control. In release 13 carrier aggregation, PUCCH groups may be configured under one MAC entity. A UE may transmit multiple PUCCHs to the same eNB.

In an example solution to this problem, a mechanism may be implemented in which Type 2 PH is reported for PCell when PUCCH on SCell is configured, regardless of configuration of simultaneousPUCCH-PUSCH on either PCell or PUCCH SCell. Such mechanism may result in additional inefficiencies. The mechanism may transmit Type 2 PHR for a PCell when it is not needed by the eNB. A PUCCH SCell may be deactivated and in that case the above mechanism may transmit unnecessary PCell Type 2 power headroom (e.g. even if simultaneousPUCCH-PUSCH is not configured for the PCell). Such solution may provide unneeded PCell Type 2 PHR to the eNB in some scenarios.

In an example solution, Type 2 PH may be reported for PUCCH SCell when PUCCH on SCell is configured, regardless of configuration of simultaneousPUCCH-PUSCH on either PCell or PUCCH SCell. Such mechanism may transmit Type 2 PHR for an SCell when it is not needed by the eNB, for example when PUCCH SCell is deactivated. This mechanism may result in additional signaling overhead and computation on the UE. A more effective mechanism may be needed to enhance PHR report process and mechanism in a UE and an eNB.

Examples in the above two paragraphs are examples of inefficient solutions. There is a need to further improve PHR process. An example embodiment, enhance PHR transmission mechanisms, e.g., when multiple PUCCH SCells are configured.

In an example embodiment, Type 1 and Type 2 PH may not be transmitted for a deactivated PUCCH SCell when PUCCH on SCell is configured. Type 2 PH is transmitted for an activated PUCCH SCell regardless of whether simultaneousPUCCH-PUSCH is configured for the PUCCH SCell or not.

In an example embodiment, a PUCCH SCell may be deactivated in some scenarios. If and when PUCCH SCell is deactivated, there is no need to include Type 1 and Type 2 PH reports in the PHR for the PUCCH SCell. This requires implementation of new processes and format of PHR, in which Type 2 and/or Type 1 PHR may or may not be reported for a PUCCH SCell.

In an example embodiment, a PUCCH SCell may be deactivated in some scenarios. Transmission of Type 2 PH for a PCell may depend on whether PUCCH SCell is activated or deactivated. When a PUCCH SCell is configured and activated, Type 2 PH is transmitted for the PCell and the PUCCH SCell regardless of whether simultaneousPUCCH-PUSCH is configured or not configured for the PCell and/or the PUCCH SCell. When the PUCCH SCell is activated, UCI on PUCCH may be transmitted in parallel with PUSCH regardless of whether simultaneousPUCCH-PUSCH is configured for the PCell or not.

When a PUCCH SCell is configured and deactivated, a Type 2 PH is transmitted for the PCell only when simultaneousPUCCH-PUSCH is configured for the PCell. When PUCCH SCell is deactivated, UCI on PUCCH of PCell may not be transmitted in parallel with PUSCH when simultaneousPUCCH-PUSCH is not configured. When PUCCH SCell is deactivated, UCI on PUCCH may be transmitted in parallel with PUSCH when simultaneousPUCCH-PUSCH is configured.

In an example embodiment, when extendedPHR2 PHR is reported, the mechanism for reporting Type 2 PH may be according to the following process: if a PUCCH SCell is configured and activated: (regardless of configuration of simultaneousPUCCH-PUSCH); obtain the value of the Type 2 power headroom for the PCell; obtain the value for the corresponding PCMAX,c field from the physical layer; obtain the value of the Type 2 power headroom for the PUCCH SCell; obtain the value for the corresponding PCMAX,c field from the physical layer; else if simultaneousPUCCH-PUSCH is configured for PCell: obtain the value of the Type 2 power headroom for the PCell; obtain the value for the corresponding PCMAX,c field from the physical layer.

In above example, Type 2 PHR is not reported when simultaneousPUCCH-PUSCH for PCell is not configured, and PUCCH SCell is configured and deactivated.

An example procedure for reporting extended power headroom is shown below:

In an example embodiment, if the MAC entity has UL resources allocated for new transmission for this TTI the MAC entity may: if it is the first UL resource allocated for a new transmission since the last MAC reset, start periodicPHR-Timer; if the Power Headroom reporting procedure determines that at least one PHR has been triggered and not cancelled, and; if the allocated UL resources can accommodate a PHR MAC control element plus its subheader if neither extendedPHR nor dualConnectivityPHR is configured, or the Extended PHR MAC control element plus its subheader if extendedPHR is configured, or the Dual Connectivity PHR MAC control element plus its subheader if dualConnectivityPHR is configured, as a result of logical channel prioritization.

The MAC layer in the UE may instruct the Multiplexing and Assembly procedure to generate and transmit an Extended PHR MAC control element for extendedPHR2 according to configured ServCellIndex and the PUCCH(s) for the MAC entity based on the values reported by the physical layer.

Activation/Deactivation may be supported for PUCCH SCell. While the PUCCH SCell is deactivated in a PUCCH group, SCells belonging to the PUCCH group may not be activated. The eNB is supposed to manage the activation/deactivation status. The eNB is supposed to deactivate an SCell when its PUCCH is remapped to a deactivated PUCCH SCell.

There may be two types of UE power headroom reports, Type 1 and Type 2. A UE power headroom PH may be valid for subframe i for serving cell c.

If the UE is configured with an SCG, and if a higher layer parameter phr-ModeOtherCG-r12 for a CG indicates 'virtual' for power headroom reports transmitted on that CG, the UE may compute PH assuming that it does not transmit a PUSCH/PUCCH on any serving cell of the other CG.

If the UE is configured with an SCG for computing power headroom for cells belonging to MCG, the term 'serving cell' may refer to a serving cell belonging to the MCG. For computing power headroom for cells belonging to an SCG, the term 'serving cell' may refer to a serving cell belonging to the SCG. The term 'primary cell' may refer to the PSCell of the SCG. If the UE is configured with a PUCCH SCell for computing power headroom for cells belonging to a primary PUCCH group, the term 'serving cell' may refer to a serving cell belonging to the primary PUCCH group. For computing power headroom for cells belonging to a secondary PUCCH group, the term 'serving cell' may refer to serving cell belonging to the secondary PUCCH group. The term 'primary cell' may refer to the PUCCH-SCell of the secondary PUCCH group.

An example Type 1 and Type 2 power headroom calculations is presented here. Example parameters and example calculation method is presented in standard document 3GPP TS 36.213 standard documents of the corresponding LTE release.

If the UE transmits PUSCH without PUCCH in subframe for serving cell c, power headroom for a Type 1 report may be computed using $$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}$$

[dB]

where, example $P_{CMAX,c}(i)$, $M_{PUSCH,c}(i)$, $P_{O\_PUSCH,c}(j)$, $\alpha_c(j)$, $PL_c$, $\Delta_{TF,c}(i)$ and $f_c(i)$ may be defined as follows. $P_{CMAX,c}(i)$ may be the configured UE transmit power in subframe i for serving cell c and $\hat{P}_{CMAX,c}(i)$ may be the linear value of $P_{CMAX,c}(i)$. $M_{PUSCH,c}(i)$ may be the bandwidth of the PUSCH resource assignment expressed in number of resource blocks valid for subframe i and serving cell c. Po_PUSCH, c(j) may be configured employing RRC configuration parameters. If the UE is configured with higher layer parameter UplinkPowerControlDedicated-v12x0 for serving cell c and if subframe i belongs to uplink power control subframe set 2 as indicated by the higher layer parameter tpc-SubframeSet-r12. For j=0 or 1, $\alpha_c(j) = \alpha_{c,2} \in \{0, 0.4, 0.5, 0.6, 0.7, 0.8, 0.9, 1\}$. $\alpha_{c,2}$ is the parameter alpha-SubframeSet2-r12 provided by higher layers for each serving cell c. For j=2, $\alpha_c(j)=1$. Otherwise: For j=0 or 1, $\alpha_c \in \{0, 0.4, 0.5, 0.6, 0.7, 0.8, 0.9, 1\}$ may be a 3-bit parameter provided by higher layers for serving cell c. For j=2, $\alpha_c(j)=1$; $PL_c$ may be the downlink path loss estimate calculated in the UE for serving cell c in dB and $PL_c$=referenceSignalPower−higher layer filtered RSRP, where referenceSignalPower is provided by higher layers and RSRP for the reference serving cell and the higher layer filter configuration for the reference serving cell.

$$\Delta_{TF,c}(i) = 10 \log_{10}((2^{BPREK \cdot K_S} - 1) \cdot \beta_{offset}^{PUSCH})$$

for $K_S$=1.25 and 0 for $K_S$=0 where $K_S$ is given by the parameter deltaMCS-Enabled provided by higher layers for each serving cell c. BPRE and $\beta_{offset}^{PUSCH}$, for each serving cell c, are computed as below. $K_S$=0 for transmission mode 2; f(i) may be a function of power control commands.

$PL_c$ is, for example, the downlink path loss estimate calculated in the UE for serving cell c in dB and $PL_c$=referenceSignalPower−higher layer filtered RSRP, where referenceSignalPower is provided by higher layers. The UE may measure on or more pathloss values employing signals received on one or more pathloss reference cells. A pathloss reference cell may be configured for a serving cell. The UE may calculate $PL_c$ and may employ one or more pathloss values ($PL_c$) for calculation of Type 1 and Type 2 power headroom fields. If serving cell c belongs to a TAG containing the primary cell then, for the uplink of the primary cell, the primary cell may be used as the reference serving cell for determining referenceSignalPower and higher layer filtered RSRP. For the uplink of the secondary cell, the serving cell configured by the higher layer parameter pathlossReferenceLinking may be used as the reference serving cell for determining referenceSignalPower and higher layer filtered RSRP. If serving cell c belongs to a TAG containing the PSCell then, for the uplink of the PSCell, the PSCell may be used as the reference serving cell for determining referenceSignalPower and higher layer filtered RSRP. For the uplink of the secondary cell other than PSCell, the serving cell configured by the higher layer parameter pathlossReferenceLinking may be used as the reference serving cell for determining referenceSignalPower and higher layer filtered RSRP.

The scheduling request (SR) is used for requesting UL-SCH resources for new transmission(s). In DC, scheduling request (SR) may be directly transmitted from UE to an SeNB via a PSCell. This may reduce scheduling delay and related signaling load.

When PUCCH groups are configured, SR resources may be configured on PCell, PUCCH SCell, or both. The possibility to have SR resources in PUCCH SCell(s) may allow better distribution of SR load among the serving cells. In an example configuration, an SR for a UE may be transmitted on a serving cell, e.g. either on the PCell or on a given PUCCH SCell. In some scenarios, there may be more capacity available on the SCell, and this may be a reason to allocate more SR resources on an PUCCH SCell. If PUCCH on an SCell carries SR signals, the chance of a UE initiated RA on the PCell due to a scheduling request may be reduced and signalling overhead and RACH resource usage may be reduced.

In an example implementation, SR resources may be configured on PUCCH SCell and no SR resources may be configured on PCell. In an example implementation, an SR load may be shared among a PUCCH SCell and a PCell. SR resources may be configured on both PCell and PUCCH SCell. Whether to configure SR resources on PCell, on the PUCCH SCell, or on both PCell and the PUCCH SCell may be up to eNB and/or UE implementation. SR resources may be configured on both PCell and PUCCH SCell. An SR_COUNTER may be increased when SR is sent on either PUCCH SCell or PCell and sr-ProhibitTimer may be implemented to control the timing of SR transmission. An SR process may employ SR resources on both a PCell and a PUCCH SCell, when both resources are configured.

In an example implementation, SR resources may be interleaved in time domain, for example, some subframes (TTIs) may include a valid SR resource on PCell, and some other subframes may include a valid SR resource on the PUCCH SCell. In an example, some TTIs may include a valid SR resource on the PCell, some TTIs may include a valid SR resource on the PUCCH SCell. In an example implementation, some TTIs may include a valid SR resource on both PCell and PUCCH SCell. When SR is configured on both an activated PUCCH SCell and a PCell, the MAC entity uses whichever SR resources comes first. When SR is triggered, it may be transmitted on the first valid SR resource available, regardless of whether SR resources is on PCell or SCell. When SR is on PUCCH SCell, there may be gain in terms of load balancing by allowing transmission of SR on an SCell. There may be some latency gain since there may be more SR resources available on the SCell. The UE may choose the first SR resources available for transmission of an SR. In an example, a valid SR resource on PCell and PUCCH SCell may overlap in time. A TTI may not include any valid SR resource or include more than one valid SR resources (on both PCell and PUCCH SCell). An eNB may employ different IEs for configuration of SR resources on PCell and PUCCH SCell. Example embodiments may be applicable to various SR configuration implementations on PCell and PUCCH SCell.

In an example embodiment, SR resources may be configured by one or more information elements in an RRC message. For example, SchedulingRequestConfig IE may be employed for configuration of PUCCH resources on the PCell and/or on a PUCCH SCell. The SchedulingRequestConfig IE may be used to specify some of the scheduling request related parameters. The SchedulingRequestConfig IE may be included in a dedicated physical layer configuration IE of a UE configuration.

The SchedulingRequestConfig IE may comprise an information element to set up or release scheduling resources and other parameters. SchedulingRequestConfig IE may comprise PUCCH resource Index (sr-ConfigIndex), SR configuration index (sr-ConfigIndex), and SR maximum transmission (dsr-TransMax) IEs. At least one RRC message may include a first SchedulingRequestConfig IE for configuration of SR resources on PCell, and a second SchedulingRequestConfig IE for configuration of SR resources on PUCCH SCell. sr-ConfigIndex may be defined and sr-PUCCH-ResourceIndex (e.g. sr-PUCCH-ResourceIndex, sr-PUCCH-ResourceIndexP1) may be defined. sr-PUCCH-ResourceIndex, sr-PUCCH-ResourceIndexP1 may be $n_{PUCCH,SRI}^{(1,p)}$ for antenna port P0 and for antenna port P1 respectively. E-UTRAN may configure sr-PUCCH-ResourceIndexP1 if sr-PUCCHResourceIndex is configured.

At least one RRC message configuring SR configuration may also include sr-ProhibitTimer IE to be employed to determine a timer value for scheduling request processes.

When an SR is triggered, the corresponding SR process may be considered as pending until it is cancelled. Pending SR(s) may be cancelled and sr-ProhibitTimer may be stopped when a MAC PDU is assembled and this PDU includes a BSR (Buffer Status Report) which contains buffer status up to (and including) the last event that triggered a BSR, or when the UL grant(s) can accommodate pending data available for transmission. If an SR is triggered and there is no other SR pending, the MAC entity may set the SR_COUNTER to 0.

As long as one SR is pending, the MAC entity and if no UL-SCH resources are available for a transmission in this TTI, and if the MAC entity has no valid PUCCH resource for SR configured in any TTI: UE (e.g. MAC entity) may initiate a Random Access procedure on the SpCell and cancel pending SRs. In an example embodiment, if SR resources are configured on a PUCCH SCell and the PUCCH SCell is deactivated, the MAC entity may not have a valid PUCCH resource for transmitting an SR signal on a deactivated PUCCH SCell. If SR resources is not configured on a PUCCH SCell, the MAC entity may not have a valid PUCCH resource for SR on the PUCCH SCell.

In an example embodiment, a UE may receive at least one RRC message comprising configuration parameters of one or more cells, the RRC message may comprise configuration parameters of scheduling request resources and processes. At least one RRC message may comprise a first SR maximum transmission information element (IE) for the PCell and a second SR maximum transmission information element for the PUCCH SCell. The at least one message may comprise a common SR prohibit timer information element which is used for both PCell and PUCCH SCell.

The at least one message may comprise a first scheduling request configuration index for scheduling request resources on the primary PUCCH, if SR resources on PCell is configured. The first scheduling request configuration index may indicate a first scheduling request period and a first offset. The at least one message may further comprise a second scheduling request configuration index for scheduling request resources on the secondary PUCCH, if SR resources are configured for a PUCCH SCell. The second scheduling request configuration index may indicate a second scheduling request period and a second offset.

In an example embodiment, an RRC message may comprise configuration parameters of SR resources on both a PCell and an SCell. In another example embodiment, a first RRC message may configuration parameters of SR resources on the PCell and a second RRC message may configuration parameters of SR resources on an SCell. The at least one RRC message may comprise the first RRC message and the second RRC message.

At least one RRC message configuring SR configuration may also include sr-ProhibitTimer information element comprising a timer value for scheduling request processes. The value of IE sr-ProhibitTimer may be in number of SR period(s). Value 0 means no timer for SR transmission on PUCCH is configured. Value 1 corresponds to one SR period, Value 2 corresponds to 2*SR periods and so on.

At least one RRC message configuring SR configuration may also include dsr-TransMax IE in SchedulingRequestConfig IE. In an example embodiment, dsr-TransMax may take the value of n4, n8, n16, n32, or n64. The value n4 corresponds to 4 transmissions, n8 corresponds to 8 transmissions and so on.

A UE may be configured by higher layers to transmit the SR on one antenna port or two antenna ports of the serving cell with configured PUCCH. The scheduling request may be transmitted on the PUCCH resource(s) $n_{PUCCH}^{(1,\tilde{p})} = n_{PUCCH,SRI}^{(1,\tilde{p})}$ for $\tilde{p}$ mapped to antenna port p, where $n_{PUCCH,SRI}^{(1,\tilde{p})}$ may be configured by higher layers unless the SR coincides in time with the transmission of HARQ-ACK using PUCCH Format 3 in which case the SR may be multiplexed with HARQ-ACK. The SR configuration for SR transmission periodicity $SR_{PERIODICITY}$ and SR subframe offset $N_{OFFSET,SR}$ may be defined by the parameter sr-ConfigIndex $I_{SR}$ given by higher layers. SR transmission instances in a serving cell configured with SR are the uplink subframes satisfying $$(10 \times n_f + \lfloor n_s/2 \rfloor - N_{OPFSET,SR}) \bmod SR_{PERIODICITY} = 0.$$

In an example embodiment, SR resources may be configured by eNB in a way that TTIs with available SR resources in a PCell and an SCell do not overlap. The time difference between two subsequent subframes with SR resources may be reduced when SR resources are configured on both PCell and PUCCH SCell.

When an SR is triggered, it may be considered as pending until it is cancelled. Pending SR(s) may be cancelled and sr-ProhibitTimer may be stopped when a MAC PDU is assembled and this PDU includes a BSR (Buffer Status Report) which contains buffer status up to (and including) the last event that triggered a BSR, or when the UL grant(s) can accommodate pending data available for transmission. If an SR is triggered and there is no other SR pending, the MAC entity may set the SR_COUNTER to 0.

In an example embodiment, whether to configure scheduling request only on PCell, only on the PUCCH SCell, or on both PCell and PUCCH SCell is up to eNB implementation. When SR is configured on both activated PUCCH SCell and PCell, the MAC entity may use whichever SR opportunity comes first for SR transmission. Based on the UE implementation, the MAC entity may choose one of SRs when SRs are configured on PUCCH SCell(s) and PCell in the same TTI. In a MAC entity, there may be only one scheduling request procedure regardless of whether scheduling request is configured on multiple cells, e.g. one SR_COUNTER which is increased when SR is sent on either PCell or PUCCH SCell and one sr-ProhibitTimer.

In a wireless device, as long as one SR is pending, and if no UL-SCH resources are available for a transmission in this TTI, and if the MAC entity has no valid PUCCH resource for SR configured in any TTI: initiate a Random Access procedure and cancel pending SRs. In an example embodiment, if SR resources are configured on a PUCCH SCell and the PUCCH SCell is deactivated, the MAC entity may not have a valid PUCCH resource for SR on a deactivated PUCCH SCell. If SR is not configured on a PUCCH SCell, the MAC entity may not have a valid PUCCH resource for SR on the PUCCH SCell. If SR resources are configured on a PUCCH SCell and the TAT associated with the TAG of the PUCCH SCell is not running, the MAC entity may not have a valid PUCCH resource for transmitting SR on the PUCCH SCell. In an example embodiment, a PUCCH SCell has valid SR resources in a subframe, if SR is configured for the SCell in the subframe, the PUCCH SCell is activated in the subframe, and the TAT associated with the TAG of PUCCH SCell is running in the subframe. If TAT of a PUCCH SCell is expired, then PUCCH resources of the SCell is released and the PUCCH SCell is no longer considered an SCell with configured PUCCH and SR resources. SR resources may be configured for an SCell that is in a TAG that its TAT is not running. In such a case, the SCell does not have valid SR resources until the TAG is uplink synchronized. When SR resources are not configured for a serving cell, that serving cell does not have valid SR resources.

The term eNB used in the various embodiments in this specification may refer to a base station in an LTE network or an enhanced LTE (eLTE) network or a 5G network.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the disclosure may also be implemented in a system comprising one or more TDD cells (e.g. frame structure 2 and/or frame structure 3-licensed assisted access). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method by a wireless device, comprising:
   receiving, from a base station, one or more messages including configuration parameters for a logical channel, wherein the configuration parameters indicates a mapping restriction of the logical channel to a first radio resource type among a plurality of radio resource types, and the first radio resource type being related to one or more first cells;
   triggering a buffer status report based on uplink data becoming available for the logical channel;
   receiving, from the base station, an uplink grant indicating radio resources of a second radio resource type among the plurality of radio resource types, the second radio resource type being related to one or more second cells different from the one or more first cells;
   triggering a scheduling request in response to:
      the triggering of the buffer status report; and
      the second radio resource type being different from the first radio resource type indicated by the mapping restriction; and
   transmitting, to the base station, the scheduling request.

2. The method of claim 1, wherein a logical channel scheduling request timer is not running when the scheduling request is triggered.

3. The method of claim 1, wherein the mapping restriction indicates that:
   first data of the logical channel is to be transmitted on the first radio resource type; and
   the first data of the logical channel is not allowed to be transmitted on the second radio resource type.

4. The method of claim 1, wherein the logical channel is identified by a logical channel identifier.

5. The method of claim 1, wherein the uplink data becomes available in the logical channel with a highest logical channel priority in a logical channel group.

6. The method of claim 1, wherein the first radio resource type is an unlicensed radio resource type and the second radio resource type is an unlicensed radio resource type.

7. The method of claim 1, wherein a second mapping restriction is configured for the buffer status report.

8. The method of claim 1, wherein the buffer status report is a regular buffer status report, and the buffer status report is identified by a logical channel identifier.

9. The method of claim 1, wherein the uplink grant indicates radio resources for new transmission, and the configuration parameters indicate scheduling request resources.

10. A method by a base station, comprising:
   transmitting, to a wireless device, one or more messages including configuration parameters for a logical channel, wherein the configuration parameters indicates a mapping restriction of the logical channel to a first radio resource type among a plurality of radio resource types, and the first radio resource type being related to one or more first cells;
   transmitting, to the wireless device, an uplink grant indicating radio resources of a second radio resource type among the plurality of radio resource types, the second radio resource type being related to one or more second cells different from the one or more first cells; and
   receiving, from the wireless device, a scheduling request, wherein the scheduling request is triggered in response to:
      triggering of a buffer status report; and
      the second radio resource type being different from the first radio resource type indicated by the mapping restriction, and wherein the triggering of the buffer status report is performed based on uplink data becoming available for the logical channel.

11. The method of claim 10, wherein a logical channel scheduling request timer is not running when the scheduling request is triggered.

12. The method of claim 10, wherein the mapping restriction indicates that:
first data of the logical channel is to be transmitted on the first radio resource type; and
the first data of the logical channel is not allowed to be transmitted on the second radio resource type.

13. The method of claim 10, wherein the logical channel is identified by a logical channel identifier.

14. The method of claim 10, wherein the uplink data becomes available in the logical channel with a highest logical channel priority in a logical channel group.

15. The method of claim 10, wherein the first radio resource type is an unlicensed radio resource type and the second radio resource type is an unlicensed radio resource type.

16. The method of claim 10, wherein a second mapping restriction is configured for the buffer status report.

17. The method of claim 10, wherein the buffer status report is a regular buffer status report, and the buffer status report is identified by a logical channel identifier.

18. The method of claim 10, wherein the uplink grant indicates radio resources for new transmission, and the configuration parameters indicate scheduling request resources.

19. A wireless device, comprising:
a transceiver; and
at least one processor configured to:
control the transceiver to receive, from a base station, one or more messages including configuration parameters for a logical channel, wherein the configuration parameters indicates a mapping restriction of the logical channel to a first radio resource type among a plurality of radio resource types, and the first radio resource type being related to one or more first cells,
trigger a buffer status report based on uplink data becoming available for the logical channel,
control the transceiver to receive, from the base station, an uplink grant indicating radio resources of a second radio resource type among the plurality of radio resource types, the second radio resource type being related to one or more second cells different from the one or more first cells,
trigger a scheduling request in response to:
the triggering of the buffer status report; and
the second radio resource type being different from the first radio resource type indicated by the mapping restriction, and
control the transceiver to transmit, to the base station, the scheduling request.

20. A base station, comprising:
a transceiver; and
at least one processor configured to control the transceiver to:
transmit, to a wireless device, one or more messages including configuration parameters for a logical channel, wherein the configuration parameters indicates a mapping restriction of the logical channel to a first radio resource type among a plurality of radio resource types, and the first radio resource type being related to one or more first cells,
transmit, to the wireless device, an uplink grant indicating radio resources of a second radio resource type among the plurality of radio resource types, the second radio resource type being related to one or more second cells different from the one or more first cells, and
receive, from the wireless device, a scheduling request,
wherein the scheduling request is triggered in response to:
triggering of a buffer status report; and
the second radio resource type being different from the first radio resource type indicated by the mapping restriction, and
wherein the triggering of the buffer status report is performed based on uplink data becoming available for the logical channel.

* * * * *